US012686996B2

(12) United States Patent (10) Patent No.: US 12,686,996 B2
Nishikawara et al. (45) Date of Patent: Jul. 21, 2026

(54) EXCAVATOR

(71) Applicant: SUMITOMO CONSTRUCTION MACHINERY CO., LTD., Tokyo (JP)

(72) Inventors: Riichi Nishikawara, Chiba (JP); Ryuji Shiratani, Chiba (JP); Kiminori Sano, Chiba (JP); Tomoki Kurokawa, Chiba (JP); Hajime Aragaki, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 421 days.

(21) Appl. No.: 18/476,801

(22) Filed: Sep. 28, 2023

(65) Prior Publication Data

US 2024/0271392 A1 Aug. 15, 2024

Related U.S. Application Data

(63) Continuation of application No. PCT/JP2022/015675, filed on Mar. 29, 2022.

(30) Foreign Application Priority Data

Mar. 29, 2021 (JP) ................................. 2021-056036
Mar. 31, 2021 (JP) ................................. 2021-061265

(51) Int. Cl.
 *E02F 9/22* (2006.01)
 *B62D 11/04* (2006.01)
 (Continued)

(52) U.S. Cl.
 CPC .............. *E02F 9/225* (2013.01); *B62D 11/04* (2013.01); *E02F 9/02* (2013.01); *E02F 9/2004* (2013.01);
 (Continued)

(58) Field of Classification Search
 CPC . E02F 9/225; E02F 9/02; E02F 9/2004; E02F 9/2025; E02F 9/2228; E02F 9/2235;
 (Continued)

(56) References Cited

U.S. PATENT DOCUMENTS 5,331,812 A * 7/1994 Imai ...................... F16H 61/423
 60/452
5,992,147 A 11/1999 Tajima
 (Continued)

FOREIGN PATENT DOCUMENTS

EP 4174236 A1 * 5/2023 ............ E02F 9/2235
JP H09-195833 7/1997
 (Continued)

OTHER PUBLICATIONS

International Search Report for PCT/JP2022/015675 mailed on Jun. 21, 2022.

*Primary Examiner* — Drew J Brown
(74) *Attorney, Agent, or Firm* — IPUSA, PLLC

(57) ABSTRACT

An excavator includes: a traveling lower body including left and right crawlers; a revolving upper body on the traveling lower body, to be capable of revolving; hydraulic motors to drive the crawlers; left and right traveling operation device to drive the hydraulic motors; a hydraulic pump to supply hydraulic oil to the hydraulic motors; and a detector to detect states of the traveling operation devices. The excavator causes the detector to detect whether there is a predetermined difference between amounts of operations of the left and right traveling operation devices, and upon detecting the predetermined difference between the amounts of operations of the left and right traveling operation devices, suppresses an amount of change in a command value related to a flow rate of the hydraulic oil discharged by the hydraulic pump.

10 Claims, 16 Drawing Sheets

(51) Int. Cl.
  *E02F 9/02* (2006.01)
  *E02F 9/20* (2006.01)
(52) U.S. Cl.
  CPC .......... *E02F 9/2025* (2013.01); *E02F 9/2228*
  (2013.01); *E02F 9/2235* (2013.01); ***E02F
  9/2285* (2013.01); *E02F 9/2296*** (2013.01);
  *E02F 9/2292* (2013.01)
(58) Field of Classification Search
  CPC ..... E02F 9/2285; E02F 9/2296; E02F 9/2292;
  E02F 9/2253; E02F 9/205; E02F 9/2282;
  B62D 11/04; F16H 61/40; B60Y
  2200/412
  See application file for complete search history.

(56) References Cited

U.S. PATENT DOCUMENTS

| | | | | |
|---|---|---|---|---|
| 9,382,925 | B2 * | 7/2016 | Lacher | F16H 61/421 |
| 11,047,405 | B2 * | 6/2021 | Jung | E02F 9/2235 |
| 12,313,093 | B2 * | 5/2025 | Yeo | E02F 9/22 |
| 2003/0167660 | A1 * | 9/2003 | Kondou | E02F 9/02 |
| | | | | 37/348 |
| 2008/0072588 | A1 * | 3/2008 | Ariga | E02F 9/2235 |
| | | | | 60/449 |
| 2012/0285157 | A1 * | 11/2012 | Okano | E02F 9/2285 |
| | | | | 60/445 |
| 2015/0013320 | A1 * | 1/2015 | Akiyama | F15B 13/021 |
| | | | | 60/429 |
| 2018/0002895 | A1 * | 1/2018 | Misaki | F02D 29/04 |
| 2019/0249391 | A1 * | 8/2019 | Kikuchi | E02F 3/845 |
| 2020/0131734 | A1 | 4/2020 | Maeda et al. | |
| 2020/0318656 | A1 * | 10/2020 | Kumeuchi | E02F 9/2004 |
| 2021/0010241 | A1 | 1/2021 | Nishi | |
| 2021/0340731 | A1 | 11/2021 | Takahashi et al. | |
| 2022/0034067 | A1 | 2/2022 | Itoh et al. | |

FOREIGN PATENT DOCUMENTS

| | | | | |
|---|---|---|---|---|
| JP | H10-299034 | | 11/1998 | |
| JP | 2004-340259 | | 12/2004 | |
| JP | 2008248981 | A * | 10/2008 | |
| JP | 2010-78047 | | 4/2010 | |
| JP | 2010178630 | A * | 8/2010 | |
| JP | 2014-181511 | | 9/2014 | |
| JP | 2020-085197 | | 6/2020 | |
| JP | 2020-159048 | | 10/2020 | |
| WO | WO-2010143616 | A1 * | 12/2010 | F15B 11/16 |
| WO | 2019/009198 | | 1/2019 | |
| WO | 2019/049327 | | 3/2019 | |
| WO | WO-2019064715 | A1 * | 4/2019 | F15B 11/028 |
| WO | 2019/189935 | | 10/2019 | |

* cited by examiner

EXCAVATOR

CROSS-REFERENCE TO RELATED APPLICATION

The present application is a continuation application of International Application No. PCT/JP2022/015675 filed on Mar. 29, 2022, which is based on and claims priority to Japanese Patent Application No. 2021-056036 filed on Mar. 29, 2021, and Japanese Patent Application No. 2021-061265 filed on Mar. 31, 2021. The contents of these applications are incorporated herein by reference in their entirety.

TECHNICAL FIELD

The present disclosure relates to an excavator.

BACKGROUND

Conventionally, an excavator provided with a hydraulic motor for traveling has been known.

However, a method of controlling the hydraulic motor for traveling when turning the excavator has not been disclosed. Therefore, the excavator described above may not be capable of turning smoothly.

SUMMARY

According to an embodiment in the present disclosure, an excavator includes: a traveling lower body including a crawler; a revolving upper body installed on the traveling lower body, and configured to be capable of revolving; a hydraulic motor for traveling configured to drive the crawler; a traveling operation device corresponding to the hydraulic motor for traveling; a hydraulic pump configured to supply hydraulic oil to the hydraulic motor for traveling; and a detector configured to detect an operation state of the traveling operation device. The crawler includes a left crawler and a right crawler. The traveling operation device includes a left traveling operation device corresponding to the left crawler and a right traveling operation device corresponding to the right crawler. The excavator causes the detector to detect whether there is a predetermined difference between an amount of operation of the left traveling operation device and an amount of operation of the right traveling operation device, and upon detecting the predetermined difference between the amount of operation of the left traveling operation device and the amount of operation of the right traveling operation device, suppresses an amount of change in a command value related to a flow rate of the hydraulic oil discharged by the hydraulic pump.

DESCRIPTION OF EMBODIMENTS

According to an embodiment in the present disclosure, an excavator that is capable of turning smoothly can be provided.

Figure 1:
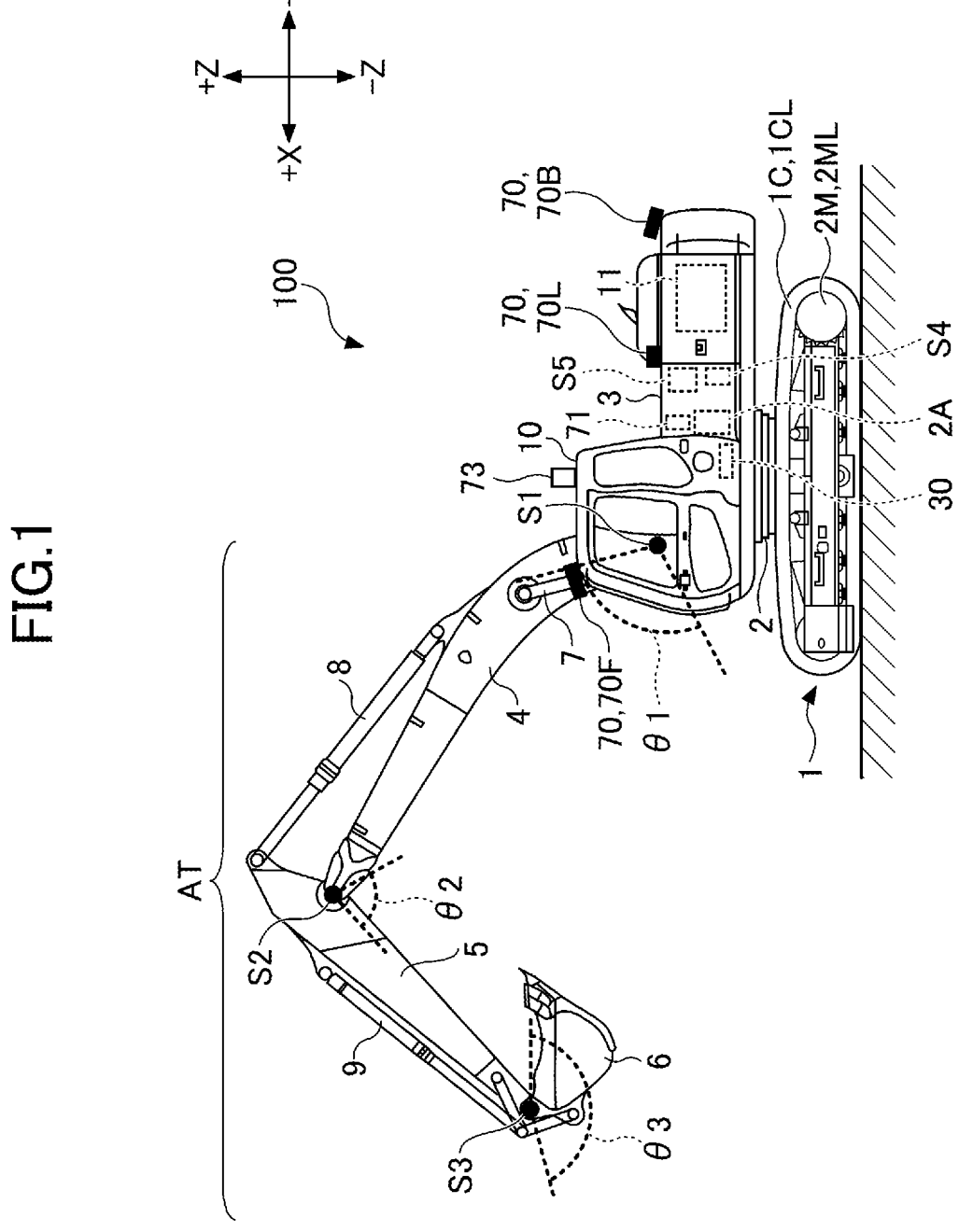
FIG. 1 is a side view of an excavator according to an embodiment in the present disclosure.
Figure 2:
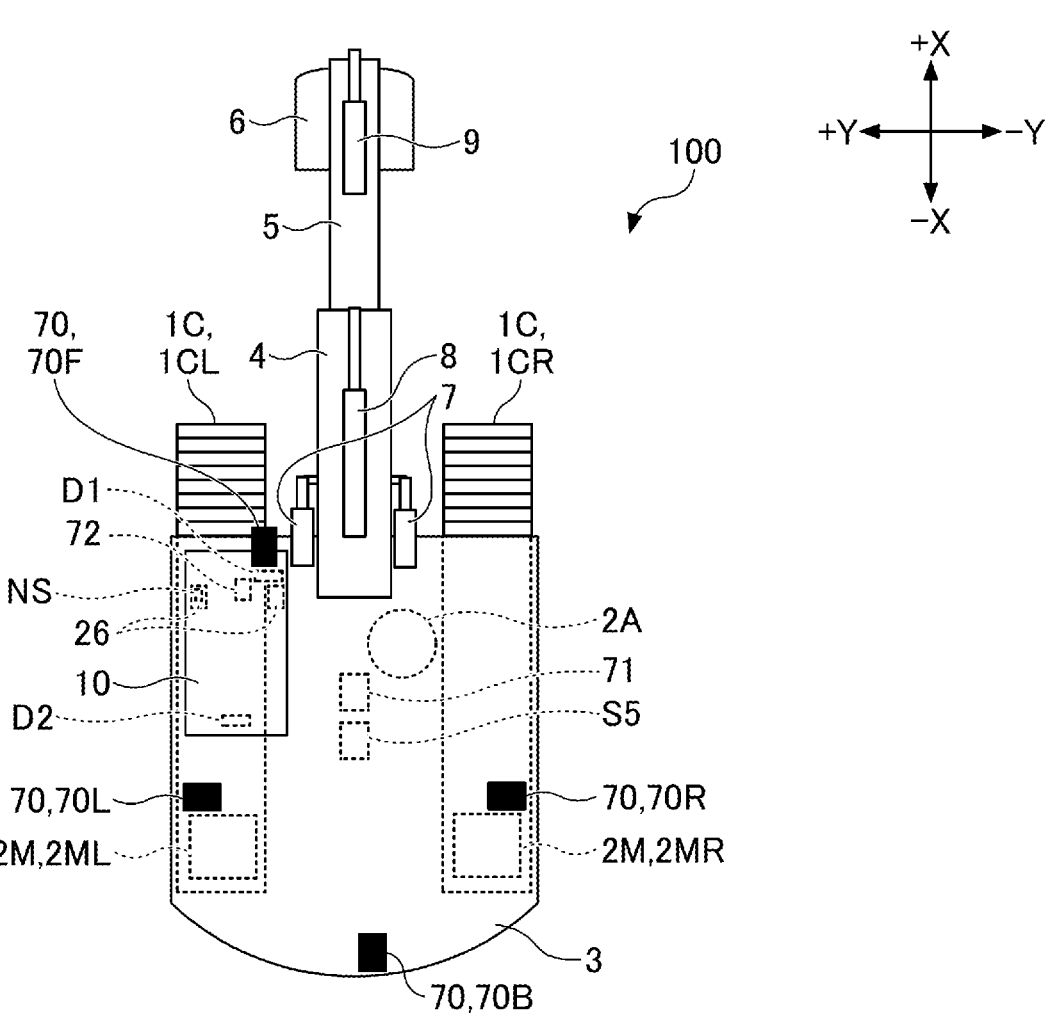
FIG. 2 is a top view of the excavator in FIG. 1.

First, with reference to FIG. 1 and FIG. 2, an excavator 100 as an excavation machine according to an embodiment in the present disclosure will be described. FIG. 1 is a side view of the excavator 100; and FIG. 2 is a top view of the excavator 100.

In the present embodiment, a traveling lower body 1 of the excavator 100 includes a crawler 1C. The crawler 1C is driven by a hydraulic motor for traveling 2M as an actuator installed in the traveling lower body 1. Specifically, the crawler 1C includes a left crawler 1CL and a right crawler 1CR. The left crawler 1CL is driven by a left hydraulic motor for traveling 2ML and the right crawler 1CR is driven by a right hydraulic motor for traveling 2MR.

On the traveling lower body 1, a revolving upper body 3 is installed, which is capable of revolving via a revolution mechanism 2. The revolution mechanism 2 is driven by a hydraulic motor for revolution 2A as an actuator for revolution installed in the revolving upper body 3. However, the actuator for revolution may be a motor-generator for revolution as an electric actuator.

A boom 4 is attached to the revolving upper body 3. An arm 5 is attached to the tip of the boom 4, and a bucket 6 as an end attachment is attached to the tip of the arm 5. The boom 4, the arm 5, and the bucket 6 constitute an excavation attachment as an example of an attachment AT. The boom 4 is driven by a boom cylinder 7, the arm 5 is driven by an arm cylinder 8, and the bucket 6 is driven by a bucket cylinder 9. The boom cylinder 7, the arm cylinder 8, and the bucket cylinder 9 constitute an attachment actuator.

The boom 4 is supported to be rotatably movable up and down with respect to the revolving upper body 3. In addition, a boom angle sensor S1 is attached to the boom 4. The boom angle sensor S1 can detect a boom angle 61 as an angle of rotation of the boom 4. For example, the boom angle 81 is the angle of elevation from a state of the boom 4 being descended most. Therefore, the boom angle θ1 becomes maximum when the boom 4 comes to the highest position.

The arm 5 is supported to be rotatably movable with respect to the boom 4. In addition, an arm angle sensor S2 is attached to the arm 5. The arm angle sensor S2 can detect an arm angle 92 as an angle of rotation of the arm 5. For example, the arm angle 92 is the angle of opening from a state of the arm 5 being closed most. Therefore, the arm angle θ2 becomes maximum when the arm 5 is opened to the maximum.

The bucket 6 is supported to be rotatably movable with respect to the arm 5. In addition, a bucket angle sensor S3 is attached to the bucket 6. The bucket angle sensor S3 can detect a bucket angle 93 as an angle of rotation of the bucket 6. The bucket angle 93 is the angle of opening from a state of the bucket 6 being closed most. Therefore, the bucket angle θ3 becomes maximum when the bucket 6 is opened most.

In the embodiment in FIG. 1, each of the boom angle sensor S1, the arm angle sensor S2, and the bucket angle sensor S3 is configured as a combination of an acceleration sensor and a gyro sensor. However, it may be constituted only with an acceleration sensor. In addition, the boom angle sensor S1 may be a stroke sensor attached to the boom cylinder 7, or may be a rotary encoder, potentiometer, inertial measuring device, or the like. The same applies to the arm angle sensor S2 and the bucket angle sensor S3.

The revolving upper body 3 is provided with a cabin 10 as the driver's cab, and has a power source such as an engine 11 installed. In addition, a space recognition device 70, an orientation detection device 71, a positioning device 73, a machine tilt sensor S4, a revolutional angular velocity sensor S5, and the like are attached to the revolving upper body 3. An operation device 26, a controller 30, an information input device 72, a display device D1, and a sound output device D2, and the like are provided in the interior of the cabin 10. Note that in the present description, for the sake of convenience, a side of the revolving upper body 3 on which the attachment AT is attached is defined as the forward direction, and a side on which the counterweight is attached is defined as the backward direction.

The space recognition device 70 is configured to recognize objects present in a three-dimensional space in the surroundings of the excavator 100. In addition, the space recognition device 70 may be configured to calculate the distance from the space recognition device 70 or the excavator 100 to a recognized object. The space recognition device 70 is, for example, an ultrasonic sensor, a millimeter-wave radar, a monocular camera, a stereo camera, a LIDAR, a distance image sensor, an infrared sensor, or the like. In the present embodiment, the space recognition device 70 is a LIDAR that is configured to emit multiple laser beams in multiple directions, and by receiving reflected light beams, calculate the distance and the direction of an object from the reflected light. The same applies to a case where a millimeter wave radar or the like as the space recognition device 70 emits electromagnetic waves toward an object. Specifically, the space recognition device 70 includes a forward sensor 70F attached to the front end of the top surface of the cabin 10; a backward sensor 70B attached to the rear end of the top surface of the revolving upper body 3; a leftward sensor 70L attached to the left end of the top surface of the revolving upper body 3; and a rightward sensor 70R attached to the right end of the top surface of the revolving upper body 3. An upward sensor to recognize objects present in a space above the revolving upper body 3 may be attached to the excavator 100.

The space recognition device 70 may be configured to capture images in the surroundings of the excavator 100. In this case, the space recognition device 70 is, for example, a monocular camera having an imaging element such as a CCD or CMOS, and outputs a captured image to the display device D1.

The space recognition device 70 may be configured to detect predetermined objects present in a predetermined area set in the surroundings of the excavator 100. In other words, the space recognition device 70 may be configured to be capable of identifying at least one of the type, position, shape, and the like of the object. For example, the space recognition device 70 may be configured to be capable of distinguishing persons from objects other than persons. Further, the space recognition device 70 may be configured to be capable of identifying the type of landform in the surroundings of the excavator 100. The type of landform is, for example, a hole, an inclined surface, a river, or the like. Further, the space recognition device 70 may be configured to be capable of identifying the type of obstacle. The types of obstacles include, for example, an electric wire, a utility pole, a person, an animal, a vehicle, work machinery and materials, a construction machine, a building, a fence, and the like. Further, the space recognition device 70 may be configured to be capable of identifying the type, size, and the like of a dump truck as a vehicle. Further, the space recognition device 70 may be configured to detect a person by recognizing a helmet, a safety vest, work clothes, or the like, or by recognizing a predetermined mark or the like on a helmet, a safety vest, work clothes, or the like. Further, the space recognition device 70 may be configured to recognize a condition of a road surface. Specifically, the space recognition device 70 may be configured to identify, for example, the type of object present on a road surface. The type of object present on a road surface is, for example, a cigarette, a can, a PET bottle, a stone, or the like.

The orientation detection device 71 is configured to detect information on a relative relationship between the orientation of the revolving upper body 3 and the orientation of the traveling lower body 1. The orientation detection device 71 may be configured with, for example, a combination of a geomagnetic sensor attached to the traveling lower body 1 and a geomagnetic sensor attached to the revolving upper body 3. Alternatively, the orientation detection device 71 may be configured with a combination of a GNSS receiver attached to the traveling lower body 1 and a GNSS receiver attached to the revolving upper body 3. The orientation detection device 71 may be a rotary encoder, rotary position sensor, or the like. In a configuration where the revolving upper body 3 is driven to perform revolutions by a motor generator for revolutions, the orientation detection device 71 may be configured with a resolver. The orientation detection device 71 may be attached to, for example, a center joint provided in connection with the revolution mechanism 2 that implements relative revolution between the traveling lower body 1 and the revolving upper body 3.

The orientation detection device 71 may also be configured with a camera attached to the revolving upper body 3. In this case, the orientation detection device 71 applies known image processing to an image captured by the camera attached to the revolving upper body 3 (an input image), to detect an image of the traveling lower body 1 included in the input image. In addition, by detecting an image of the traveling lower body 1 using a known image recognition technique, the orientation detection device 71 identifies the longitudinal direction of the traveling lower body and then, derives an angle formed between the direction of the front-and-back axis of the revolving upper body 3 and the longitudinal direction of the traveling lower body 1. The direction of the front-and-back axis of the revolving upper body 3 is derived from the attached position of the camera. In particular, as the crawler 1C protrudes from the revolving upper body 3, by detecting an image of the crawler 1C, the orientation detection device 71 can identify the longitudinal direction of the traveling lower body 1. In this case, the orientation detection device 71 may be integrated into the controller 30.

The information input device 72 is configured to allow the operator of the excavator to input information into the controller 30. In the present embodiment, the information input device 72 is a switch panel installed to be close to a display unit of the display device D1. However, the information input device 72 may be a touch panel arranged on the display unit of the display device D1, or may be a sound input device such as a microphone arranged in the cabin 10. In addition, the information input device 72 may be a communication device. In this case, an operator can input information to the controller 30 via a communication terminal such as a smartphone.

The positioning device 73 is configured to measure a current position. In the present embodiment, the positioning device 73 is a GNSS receiver that detects the position of the revolving upper body 3, and outputs a detected value to controller 30. The positioning device 73 may be a GNSS compass. In this case, the positioning device 73 can detect the position and the orientation of the revolving upper body 3.

The machine tilt sensor S4 detects the tilt of the revolving upper body 3 with respect to a predetermined plane. In the present embodiment, the machine tilt sensor S4 is an acceleration sensor to detect the tilt angle around the front-and-back axis and the tilt angle around the right-and-left axis of the revolving upper body 3 with respect to the horizontal plane. The front-and-back axis and the right-and-left axis of the revolving upper body 3 are, for example, orthogonal to each other, and pass through the center point of the excavator as a point along the pivot of the excavator 100.

The revolutional angular velocity sensor S5 detects the revolutional angular velocity of the revolving upper body 3. In the present embodiment, it is a gyro sensor, or may be a resolver, a rotary encoder, or the like. The revolutional angular velocity sensor S5 may detect the revolutional velocity. The revolutional velocity may be calculated from the revolutional angular velocity.

In the following, at least one of the boom angle sensor S1, the arm angle sensor S2, the bucket angle sensor S3, the machine tilt sensor S4, and the revolutional angular velocity sensor S5 is also referred to as a position detection device. The position of the attachment AT is detected based on, for example, the respective outputs of the boom angle sensor S1, the arm angle sensor S2, and the bucket angle sensor S3.

The display device D1 is a device to display information. In the present embodiment, the display device D1 is a liquid crystal display installed in the cabin 10. However, the display device D1 may be a display of a communication terminal such as a smartphone.

The sound output device D2 is a device to output sound. The sound output device D2 includes at least one of a device to output sound to the operator inside the cabin 10, and a device to output sound to a worker outside the cabin 10. It may be a speaker attached to a communication terminal.

The operation device 26 is a device used by the operator for operating the actuators.

The controller 30 is a control device for controlling the excavator 100. In the present embodiment, the controller 30 is configured as a computer that includes a CPU, a RAM, an NVRAM, a ROM, and the like. In addition, the controller 30 reads a program corresponding to various functions from the ROM to load the program in the RAM, and causes the CPU to execute the corresponding processing. The functions includes, for example, a machine guidance function that guides a manual operation of the excavator 100 performed by the operator; and a machine control function to assist a manual operation of the excavator 100 performed by the operator, or to cause the excavator 100 to operate automatically or autonomously.

Figure 3:
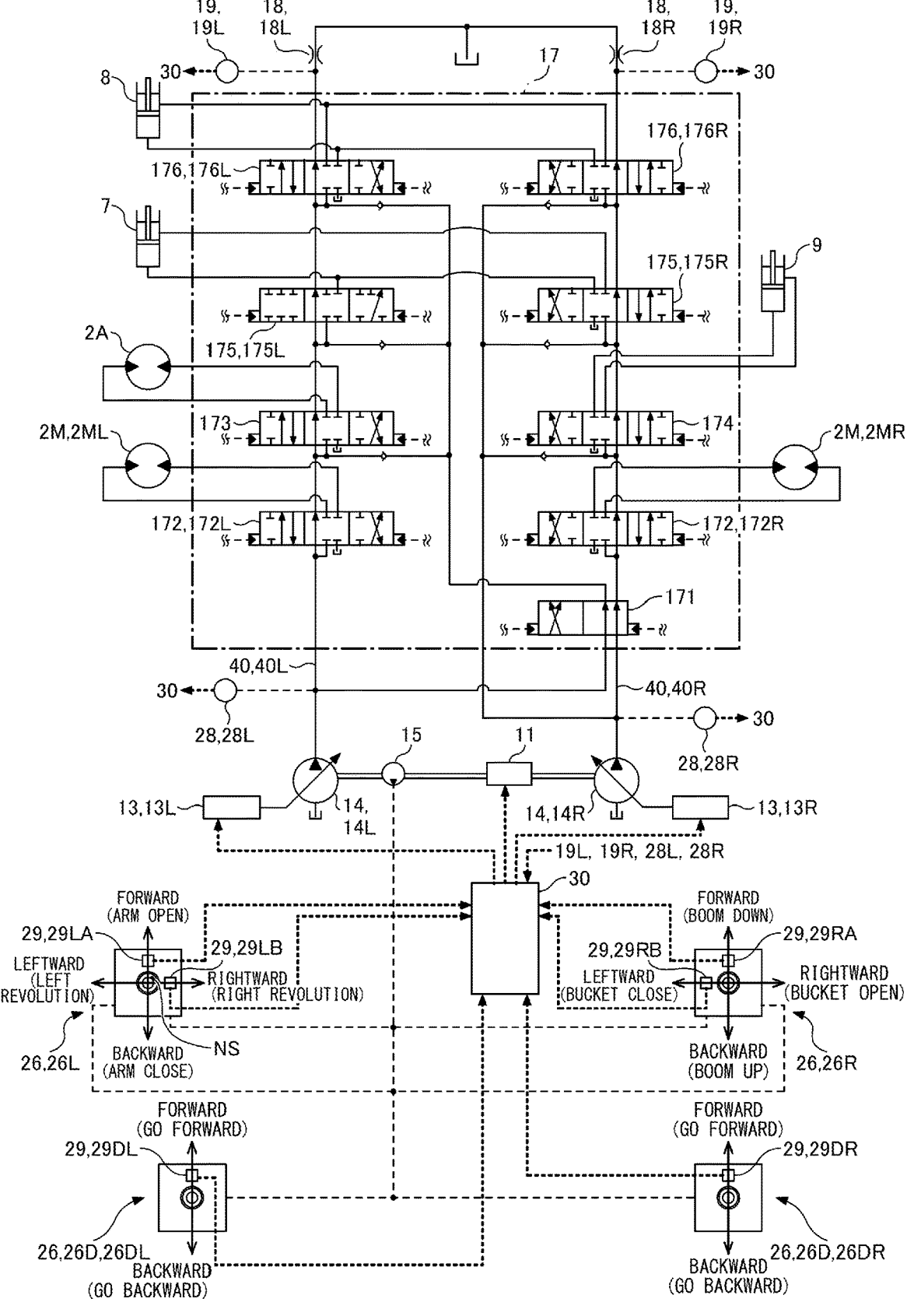
FIG. 3 is a diagram illustrating an example of a configuration of a hydraulic system installed in the excavator in FIG. 1.

Next, with reference to FIG. 3, an example of a configuration of a hydraulic system installed in the excavator 100 will be described. FIG. 3 is a diagram illustrating an example of a configuration of a hydraulic system installed in the excavator 100. In FIG. 3, a mechanical power transmission system, hydraulic oil lines, pilot lines, and an electrical control system are designated with double lines, solid lines, dashed lines, and dotted lines, respectively.

The hydraulic system of the excavator 100 primarily includes an engine 11, pump regulators 13, main pumps 14, a control pump 15, a control valve unit 17, an operation device 26, discharge pressure sensors 28, operation pressure sensors 29, a controller 30, and the like.

In FIG. 3, the hydraulic system is configured to be capable of circulating hydraulic oil from the main pumps 14, which is driven by the engine 11, to the hydraulic oil tank via center bypass pipelines 40 or parallel pipelines 42.

The engine 11 is the driving source of the excavator 100. In the present embodiment, the engine 11 is, for example, a diesel engine that operates to maintain a predetermined number of revolutions. The output shaft of the engine 11 is coupled with the respective input shafts of the main pumps 14 and the control pump 15.

The main pump 14 is configured to be capable of supplying the hydraulic oil to the control valve unit 17 via hydraulic oil lines. In the present embodiment, the main pump 14 is a swashplate-type, variable-capacity hydraulic pump.

The pump regulator 13 is configured to be capable of controlling the discharge amount of the main pump 14. In the present embodiment, the pump regulator 13 adjusts the tilt angle of the swashplate of the main pump 14 according to a control command from the controller 30, so as to control the discharge amount of the main pump 14.

The control pump 15 is an example of a pilot pressure generation device, and configured to be capable of supplying the hydraulic oil to a hydraulic control device including the operation device 26 via the pilot lines. In the present embodiment, the control pump 15 is a fixed-capacity hydraulic pump. However, the pilot pressure generation device may be implemented by the main pump 14. In other words, in addition to the function of supplying the hydraulic oil to the control valve unit 17 via the hydraulic oil line, the main pumps 14 may include a function of supplying the hydraulic oil to the various oil pressure controlling devices including the operation device 26 via the pilot line. In this case, the control pump 15 may be omitted.

The control valve unit 17 is a hydraulic control device that control the hydraulic system in the excavator 100. In the present embodiment, the control valve unit 17 include control valves 171 to 176. The control valve 172 include a control valve 172L and a control valve 172R; the control valve 175 include a control valve 175L and a control valve 175R; and the control valve 176 include a control valve 176L and a control valve 176R. The control valve unit 17 is configured to be capable of selectively supplying the hydraulic oil discharged by the main pumps 14 to one or more hydraulic actuators through the control valves 171 to 176. The control valves 171 to 176 control, for example, the flow rate of the hydraulic oil flowing from the main pumps 14 to the hydraulic actuators, and the flow rate of the hydraulic oil flowing from the hydraulic actuators to the hydraulic oil tank. The hydraulic actuators include a boom cylinder 7, an arm cylinder 8, a bucket cylinder 9, a left hydraulic motor for traveling 2ML, a right hydraulic motor for traveling 2MR, and a hydraulic motor for revolution 2A.

The operation device 26 is a device used by the operator for operating the actuators. The operation device 26 includes, for example, an operation lever and an operation pedal. The actuators include at least one of a hydraulic actuator and an electric actuator. In the present embodiment, the operation device 26 is configured to be capable of supplying, via the pilot lines, the hydraulic oil discharged by the control pump 15 to the pilot port of a corresponding control valve in the control valve unit 17. The pressure (pilot pressure) of the hydraulic oil supplied to each of the pilot ports is a pressure depending on the operational direction and the operational amount of a lever or pedal of the operation device 26 corresponding to each of the hydraulic actuators. However, the operation device 26 may be of an electrically controlled type, instead of a pilot pressure type as described above. In this case, each control valve in the control valve unit 17 may be an electromagnetic solenoid type spool valve.

The discharge pressure sensors 28 are configured to be capable of detecting the discharge pressure of the main pumps 14 as an example of circuit pressure. The circuit pressure is a pressure of the hydraulic oil in the hydraulic circuit installed on the excavator 100. In the present embodiment, the discharge pressure sensors 28 output the detected values to the controller 30.

The operation pressure sensors 29 are an example of detection means for detecting the operating state of an operation device, and configured to be capable of detecting the contents of an operation performed by the operator on the operation device 26. In the present embodiment, each of the operation pressure sensors 29 detects the operational direction and the operational amount of the operation device 26 corresponding to one of the actuators in the form of pressure (hydraulic pressure), and outputs the detected value to the controller 30. The contents of an operation on the operation device 26 may be detected using sensors other than the operation pressure sensors.

The main pumps 14 include a left main pump 14L and a right main pump 14R. In addition, the left main pump 14L circulates hydraulic oil through a left center bypass pipeline 40L or a left parallel pipeline 42L to the hydraulic oil tank, and the right main pump 14R circulates hydraulic oil through a right center bypass pipeline 40R or a right parallel pipeline 42R to the hydraulic oil tank.

The left center bypass pipeline 40L is a hydraulic oil line passing through the control valves 172L, 173, 175L, and 176L arranged in the control valve unit 17. The right center bypass pipeline 40R is a hydraulic oil line passing through the control valves 171, 172R, 174, 175R, and 176R arranged in the control valve unit 17.

The control valve 171 is a spool valve that functions as a straight travel valve. In the present embodiment, the control valve 171 can switch the flow of the hydraulic oil so as to supply the hydraulic oil from the left main pump 14L to each of the left hydraulic motor for traveling 2ML and the right hydraulic motor for traveling 2MR, in order to increase the straightness of the traveling lower body 1. Specifically, in the case where the hydraulic motor for traveling 2M and any of the other hydraulic actuators are operated at the same time, the control valve 171 is switched so that the left main pump 14L can supply the hydraulic oil to both the left hydraulic motor for traveling 2ML and the right hydraulic motor for traveling 2MR. On the other hand, in the case where the hydraulic motor for traveling 2M is operated, and none of the other hydraulic actuators is operated, the control valve 171 is switched so that the left main pump 14L can supply the hydraulic oil to the left hydraulic motor for traveling 2ML, and the right main pump 14R can supply the hydraulic oil to the right hydraulic motor for traveling 2MR.

The control valve 172L is a spool valve to supply the hydraulic oil discharged by the left main pump 14L to the left hydraulic motor for traveling 2ML, and to switch the flow of the hydraulic oil discharged by the left hydraulic motor for traveling 2ML so as to discharge the hydraulic oil into the hydraulic oil tank.

The control valve 172R is a spool valve to supply the hydraulic oil discharged by the right main pump 14R to the right hydraulic motor for traveling 2MR, and to switch the flow of the hydraulic oil discharged by the right hydraulic motor for traveling 2MR so as to discharge the hydraulic oil into the hydraulic oil tank.

The control valve 173 is a spool valve to supply the hydraulic oil discharged by the left main pump 14L to the hydraulic motor for revolution 2A, and to switch the flow of the hydraulic oil discharged by the hydraulic motor for revolution 2A so as to discharge the hydraulic oil into the hydraulic oil tank.

The control valve 174 is a spool valve to supply the hydraulic oil discharged by the right main pump 14R to the bucket cylinder 9, and to switch the flow of the hydraulic oil in the bucket cylinder 9 so as to discharge the hydraulic oil into the hydraulic oil tank.

The control valve 175L is a spool valve to switch the flow of the hydraulic oil so as to supply the hydraulic oil discharged by the left main pump 14L to the boom cylinder 7. The control valve 175R is a spool valve to supply the hydraulic oil discharged by the right main pump 14R to the boom cylinder 7, and to switch the flow of the hydraulic oil in the boom cylinder 7 so as to discharge the hydraulic oil into the hydraulic oil tank.

The control valve 176L is a spool valve to supply the hydraulic oil discharged by the left main pump 14L to the arm cylinder 8, and to switch the flow of the hydraulic oil in the arm cylinder 8 so as to discharge the hydraulic oil into the hydraulic oil tank.

The control valve 176R is a spool valve to supply the hydraulic oil discharged by the right main pump 14R to the arm cylinder 8, and to switch the flow of the hydraulic oil in the arm cylinder 8 so as to discharge the hydraulic oil into the hydraulic oil tank.

The left parallel pipeline 42L is a hydraulic oil line parallel to the left center bypass pipeline 40L. The left parallel pipeline 42L can supply the hydraulic oil to a downstream control valve in the case where the flow of the hydraulic oil through the left center bypass pipeline 40L is restricted or cut off by one of the control valves 172L, 173, and 175L. The right parallel pipeline 42R is a hydraulic oil line parallel to the right center bypass pipeline 40R. The right parallel pipeline 42R can supply the hydraulic oil to a downstream control valve in the case where the flow of the hydraulic oil through the right center bypass pipeline 40R is restricted or cut off by one of the control valves 172R, 174, and 175R.

The pump regulators 13 include a left pump regulator 13L and a right pump regulator 13R. Depending on the discharge pressure of the left main pump 14L, the left pump regulator 13L adjusts the tilt angle of the swashplate of the left main pump 14L, so as to control the discharge amount of the left main pump 14L. Specifically, the left pump regulator 13L adjusts the tilt angle of the swashplate of the left main pump 14L, for example, in response to an increase in the discharge pressure of the left main pump 14L, so as to reduce the discharge amount. The same applies to the right pump regulator 13R. This is to control the absorbed power (absorbed horsepower) of the main pumps 14, which is expressed by a product of the discharge pressure and the discharge volume, so as not to exceed the output power (output horsepower) of the engine 11.

The operation device 26 includes a left operation lever 26L and a right operation lever 26R as an attachment operation device, and a traveling lever 26D as a traveling operation device. The traveling levers 26D as the traveling operation device include a left traveling lever 26DL as a left traveling operation device and a right traveling lever 26DR as a right traveling operation device.

The left operation lever 26L as the attachment operation device is used for a revolution operation and an operation of the arm 5. When the left operation lever 26L is operated in the front-and-back direction, the hydraulic oil discharged by the control pump 15 is used for introducing a control pressure according to the operational amount of the lever into the pilot port of the control valve 176. In addition, when operated in the right-and-left direction, the hydraulic oil discharged by the control pump 15 is used for introducing a control pressure according to the operational amount of the lever into the pilot port of the control valve 173.

Specifically, when operated in the arm-closing direction, the left operation lever 26L introduces hydraulic oil into the right pilot port of the control valve 176L, and introduces hydraulic oil into the left pilot port of the control valve 176R. In addition, when operated in the arm-opening direction, the left operation lever 26L introduces hydraulic oil into the left pilot port of the control valve 176L, and introduces hydraulic oil into the right pilot port of the control valve 176R. In addition, when operated in the left-revolution direction, the left operation lever 26L introduces hydraulic oil into the left pilot port of the control valve 173, and when operated in the right-revolution direction, introduces hydraulic oil into the right pilot port of the control valve 173.

The right operation lever 26R as the attachment operation device is used for an operation of the boom 4 and an operation of the bucket 6. When the right operation lever 26R is operated in the front-and-back direction, the hydraulic oil discharged by the control pump 15 is used for introducing a control pressure according to the operational amount of the lever into the pilot port of the control valve 175. In addition, when operated in the right-and-left direction, the hydraulic oil discharged by the control pump 15 is used for introducing a control pressure according to the operational amount of the lever into the pilot port of the control valve 174.

Specifically, when operated in the boom-descending direction, the right operation lever 26R introduces hydraulic oil into the left pilot port of the control valve 175R. In addition, when operated in the boom-raising direction, the right operation lever 26R introduces hydraulic oil into the right pilot port of the control valve 175L, and introduces hydraulic oil into the left pilot port of the control valve 175R. In addition, when operated in the bucket-closing direction, the right operation lever 26R introduces hydraulic oil into the right pilot port of the control valve 174, and when operated in the bucket-opening direction, introduces hydraulic oil into the left pilot port of the control valve 174.

The traveling levers 26D are an example of the traveling operation device, and used for operations of the crawlers 1C. Specifically, the left traveling lever 26DL as an example of the left traveling operation device is used for an operation of the left crawler 1CL. It may be configured to be linked with a left traveling pedal, which is another example of a left traveling operation device. When the left traveling lever 26DL is operated in the front-and-back direction, the hydraulic oil discharged by the control pump 15 is used for introducing a control pressure according to the operational amount of the lever into the pilot port of the control valve 172L. The right traveling lever 26DR as an example of a right traveling operation device is used for operating the right crawler 1CR. It may be configured to be linked with a right traveling pedal, which is another example of a right traveling operation device. When the right traveling lever 26DR is operated in the front-and-back direction, the hydraulic oil discharged by the control pump 15 is used for introducing a control pressure according to the operational amount of the lever into the pilot port of the control valve 172R.

The discharge pressure sensors 28 include a discharge pressure sensor 28L and a discharge pressure sensor 28R. The discharge pressure sensor 28L detects the discharge pressure of the left main pump 14L, and outputs the detected value to the controller 30. The same applies to the discharge pressure sensor 28R.

The operation pressure sensors 29 include operation pressure sensors 29LA, 29LB, 29RA, 29RB, 29DL, and 29DR. The operation pressure sensor 29LA detects the contents of an operation in the front-and-back direction performed by the operator on the left operation lever 26L in the form of pressure, and outputs the detected value to the controller 30. The contents of an operation include, for example, the operational direction of the lever and the operational amount of the lever (the operation angle of the lever).

Similarly, the operation pressure sensor 29LB detects the contents of an operation in the right-and-left direction performed by the operator on the left operation lever 26L in the form of pressure, and outputs the detected value to the controller 30. The operation pressure sensor 29RA detects the contents of an operation in the front-and-back direction performed by the operator on the right operation lever 26R in the form of pressure, and outputs the detected value to the controller 30. The operation pressure sensor 29RB detects the contents of an operation in the right-and-left direction performed by the operator on the right operation lever 26R in the form of pressure, and outputs the detected value to the controller 30. The operation pressure sensor 29DL is an example of a detector to detect an operation state of an traveling operation device, detects the contents of an operation in the front-and-back direction performed by the operator on the left traveling lever 26DL in the form of pressure, and outputs the detected value to the controller 30. The operation pressure sensor 29DR is an example of a detector to detect an operation state of an travelling operation device, detects the contents of an operation in the front-and-back direction performed by the operator on the right traveling lever 26DR in the form of pressure, and outputs the detected value to the controller 30.

The controller 30 receives the output of the operation pressure sensors 29, and outputs a control command to the pump regulators 13 when necessary, to vary the discharge amount of the main pumps 14. In addition, the controller 30 receives output of a control pressure sensor 19 provided upstream of a throttle 18, and outputs a control command to the pump regulator 13 as required, to change the discharge amount of the main pump 14. The throttle 18 includes a left throttle 18L and a right throttle 18R, and the control pressure sensor 19 includes a left control pressure sensor 19L and a right control pressure sensor 19R.

Along the left center bypass pipeline 40L, the left throttle 18L is arranged between the control valve 176L located most downstream, and the hydraulic oil tank. Therefore, the flow of the hydraulic oil discharged by the left main pump 14L is restricted by the left throttle 18L. In addition, the left throttle 18L generates a control pressure for controlling the left pump regulator 13L. The control pressure is an example of a circuit pressure. The left control pressure sensor 19L is a sensor for detecting this control pressure, and outputs a detected value to the controller 30. In response to this control pressure, the controller 30 adjusts the tilt angle of the swashplate of the left main pump 14L, so as to control the discharge amount of the left main pump 14L. The controller 30 reduces the discharge amount of the left main pump 14L to be smaller while this control pressure becomes greater, and increases the discharge amount of the left main pump 14L to be greater while this control pressure becomes smaller. The controller 30 also controls the discharge amount of the right main pump 14R in substantially the same way.

Specifically, as illustrated in FIG. 3, in the case where none of the hydraulic actuators in the excavator 100 is operated, the hydraulic oil discharged by the left main pump 14L reaches the left throttle 18L through the left center bypass pipeline 40L. In addition, the flow of the hydraulic oil discharged by the left main pump 14L increases the control pressure generated upstream of the left throttle 18L. As a result, the controller 30 reduces the discharge amount of the left main pump 14L down to the minimum allowable discharge amount, to suppress pressure loss (pumping loss) when the discharged hydraulic oil passes through the left center bypass pipeline 40L. On the other hand, in the case where one of the hydraulic actuators is operated, the hydraulic oil discharged by the left main pump 14L flows into the hydraulic actuator through a control valve corresponding to the hydraulic actuator to be operated. Then, the flow of the hydraulic oil discharged by the left main pump 14L reduces or eliminates the amount to reach the left throttle 18L, which reduces the control pressure generated upstream of the left throttle 18L. As a result, the controller 30 increases the discharge amount of the left main pump 14L, to cause a sufficient amount of the hydraulic oil to circulate in the hydraulic actuator to be operated, so as to surely drive the hydraulic actuator to be operated. Note that the controller 30 also controls the discharge amount of the right main pump 14R in substantially the same way.

With the configuration as described above, the hydraulic system in FIG. 3 can suppress wasteful energy consumption in the main pumps 14 in a stand-by state. The wasteful energy consumption includes a pumping loss generated by the hydraulic oil discharged by the main pumps 14 in the center bypass pipelines 40. In addition, in the case of operating a hydraulic actuator, the hydraulic system in FIG. 3 can securely supply a necessary and sufficient amount of the hydraulic oil from the main pumps 14 to the hydraulic actuators to be operated.

However, the hydraulic system illustrated in FIG. 3 is an example of the hydraulic system installed on the excavator 100. The hydraulic system installed on the excavator 100 is not limited to the hydraulic system using the negative control method as illustrated in FIG. 3. For example, the hydraulic system installed on the excavator 100 may be a hydraulic system using a positive control method or a load sensing method.

Figure 4:
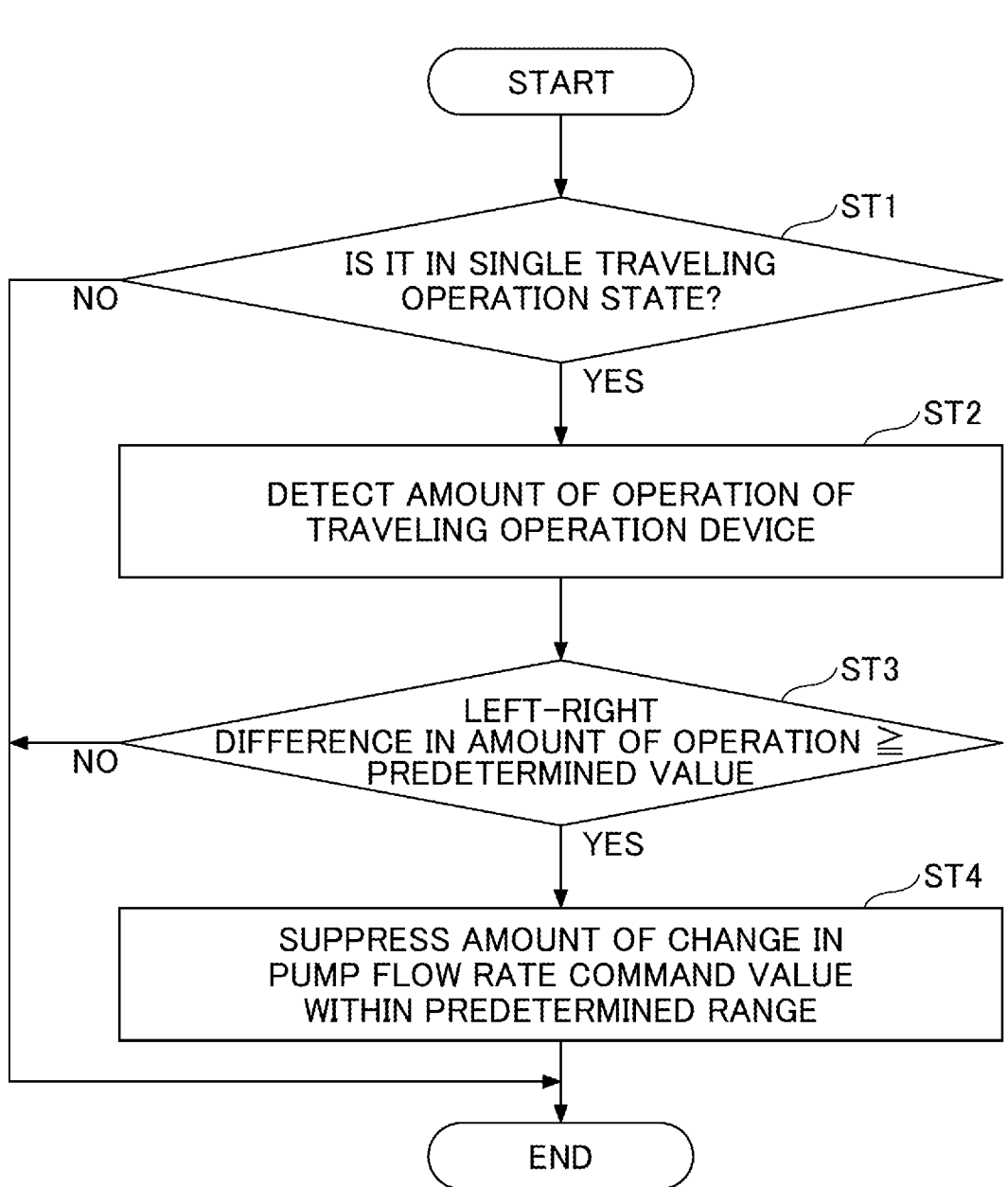
FIG. 4 is a flow chart of a traveling support process.

Next, with reference to FIG. 4, one example of a process in which the controller 30 supports traveling of the excavator 100 when the traveling operation device is operated (hereafter, referred to as a "traveling support process") will be described. FIG. 4 is a flow chart of a traveling support process. The controller 30 repeatedly executes the traveling support process at predetermined control periods when the traveling operation device is operated.

In the present embodiment, the controller 30 is configured to execute the traveling support process to support the excavator 100 in turning. The turning includes, for example, making the forward speed of the left crawler 1CL and the forward speed of the right crawler 1CR different from each other to advance the traveling lower body 1. In other words, making the right speed of the left hydraulic motor for traveling 2ML and the right speed of the right hydraulic motor for traveling 2MR different from each other to advance the traveling lower body 1. In the case where the forward speed of the left crawler 1CL is greater than the forward speed of the right crawler 1CR, the excavator 100 turns in the right direction. In this case, the left crawler 1CL is also referred to as the outside crawler, and the right crawler 1CR is also referred to as the inside crawler. Similarly, in the case where the forward speed of the left crawler 1CL is less than the forward speed of the right crawler 1CR, the excavator 100 turns in the left direction. In this case, the left crawler 1CL is also referred to as the inside crawler, and the right crawler 1CR is also referred to as the outside crawler. Note that in the case where the forward speed of the left crawler 1CL and the forward speed of the right crawler 1CR are the same, the excavator 100 travels straight.

For example, in the case of causing the excavator 100 traveling straight to turn in the left direction, the operator makes the amount of operation of the left traveling lever 26DL in the forward direction less than the amount of operation of the right traveling lever 26DR in the forward direction. In this case, the operator may change only the amount of operation of the left traveling lever 26DL; may change only the amount of operation of the right traveling lever 26DR; or may change the amount of operation of each of the left traveling lever 26DL and the right traveling lever 26DR.

However, there may be a case where the excavator 100 cannot turn smoothly in the left direction, even if, for example, the operator decreases the amount of operation of the left traveling lever 26DL at a substantially constant rate without changing the amount of operation of the right traveling lever 26DR. In other words, there may be a case where the traveling trajectory of the crawler 1C results in a trajectory different from the desired traveling trajectory. This is because the condition of the road surface tends to change suddenly at a work site. Note that the condition of the road surface includes, for example, whether earth and sand forming the road surface is clayey or sandy; whether it is dry or wet; whether it is covered with snow or not; whether there are many or few irregularities; whether it is an upward slope or a downward slope; and the like.

For example, if the smoothness of the left crawler 1CL becomes worse (e. g., if the coefficient of friction of the ground with which the left crawler 1CL is in contact becomes greater), the traveling load of the right crawler 1CR during forward movement increases, and the forward speed of the right crawler 1CR decreases; therefore, the excavator 100 becomes unable to turn smoothly in the left direction.

Alternatively, if the smoothness of the left crawler 1CL becomes better (e. g., if the coefficient of friction of the ground with which the left crawler 1CL is in contact becomes smaller), the left crawler 1CL drifts; therefore, the excavator 100 becomes unable to turn smoothly in the left direction.

Also in the case where an operation performed by the operator is not appropriate, the excavator 100 may become unable to turn smoothly in the left direction. This is because, for example, in the case where the operator suddenly decreases the amount of operation of the left traveling lever 26DL, the traveling load of the right crawler 1CR suddenly increases, and the forward speed of the right crawler 1CR suddenly decreases.

In other words, it is considered that the reasons why the excavator 100 becomes unable to turn smoothly include: the discharge amount of the main pump 14 suddenly changing due to a sudden change in the traveling load; the value of a control command generated according to an operation of the traveling operation device performed by the operator being not appropriately limited; and the like.

Therefore, in the present embodiment, by executing the traveling support process as will be described in detail below, the controller 30 is configured to be capable of causing the excavator 100 to turn smoothly in the case where the operator performs an operation for turning.

First, the controller 30 determines whether it is in a single traveling operation state (Step ST1). The single traveling operation state is one of the states of the excavator 100, and is a state in which only the traveling operation device among the operation device 26 including the attachment operation device and the traveling operation device is operated. The state of the excavator 100 includes, in addition to the single traveling operation state, a combined traveling operation state, a no operation state, a single attachment operation state, and the like. The combined traveling operation state is a state in which the attachment operation device and the traveling operation device are operated at the same time. The no operation state is a state in which neither the attachment operation device nor the traveling operation device is operated. The single attachment operation state is a state in which only the attachment operation device is operated.

In the present embodiment, the controller 30 determines whether the excavator 100 is in the single traveling operation state, based on the output of the operation pressure sensor 29. However, the controller 30 may determine whether the state of the excavator 100 is the single traveling operation state, based on the output of another device as a detector that detects the operation state of the traveling operation device, such as a sensor that detects the inclination of the traveling lever 26D, a camera that captures the operation state of the traveling lever, and the like.

If it is determined that the state is not the single traveling operation state (NO at Step ST1), the controller 30 ends the current traveling support process.

On the other hand, if it is determined as being in the single traveling operation state (YES at Step ST1), the controller 30 detects the amount of operation of the traveling operation device (Step ST2). In the present embodiment, the controller 30 detects the amount of operation of the left traveling lever 26DL based on the output of the operation pressure sensor 29DL, and detects the amount of operation of the right traveling lever 26DR based on the output of the operation pressure sensor 29DR. The same applies to the case where the traveling pedal is stepped on.

Thereafter, the controller 30 determines whether the left-right difference in the amount of operation is greater than or equal to a predetermined value (Step ST3). This is to determine whether turning (a steering operation) is being executed. In the present embodiment, the controller 30 determines whether the difference between the amount of operation of the left traveling lever 26DL and the amount of operation of the right traveling lever 26DR is greater than or equal to the predetermined value.

If it is determined that the left-right difference in the amount of operation is less than the predetermined value (NO at Step ST3), the controller 30 ends the current traveling support process.

On the other hand, if it is determined that the left-right difference in the amount of operation is greater than or equal to the predetermined value (YES at Step ST3), the controller 30 suppresses the amount of change in the pump flow rate command value within a predetermined range (Step ST4).

The pump flow rate command value is a command value transmitted by the controller 30 to the pump regulator 13. The pump flow rate command value includes a left pump flow rate command value for the left pump regulator 13L corresponding to the left main pump 14L, and a right pump flow rate command value for the right pump regulator 13R corresponding to the right main pump 14R. In the present embodiment, the discharge amount of the main pump 14 increases as the pump flow rate command value increases.

The predetermined range may be a range stored in advance, or may be a range derived dynamically. As the predetermined range, for example, one of multiple ranges stored in advance is selected based on at least one of the current state of the main pump 14, the current states of the control valve 172L and the control valve 172R, and the like. Specifically, as the predetermined range, one of multiple ranges stored in advance is selected based on at least one of the left-right difference in the amount of operation, the circuit pressure, the motor pressure, the number of revolutions of the engine, and the like. The content to be selected in the predetermined range may be changed depending on whether the operation is a sudden operation. The left-right difference in the amount of operation and whether the operation is a sudden operation are derived based on, for example, the output of the operation pressure sensor 29. The motor pressure is, for example, a pressure of the hydraulic oil flowing into the hydraulic motor for traveling 2M. The left motor pressure, which is a pressure of the hydraulic oil flowing into the left hydraulic motor for traveling 2ML, may be detected by, for example, a pressure sensor installed in a pipeline connecting the control valve 172L and the left hydraulic motor for traveling. The same applies to the right motor pressure, which is a pressure of the hydraulic oil flowing into the right hydraulic motor for traveling 2MR.

In this way, by suppressing the amount of change in the pump flow rate command value per unit time within the predetermined range, the controller 30 can prevent the discharge amount of the main pump 14 from changing excessively, even in the case where the traveling load is suddenly changed or in the case where the traveling operation device is suddenly operated by the operator. In other words, the controller 30 can change the discharge amount of the main pump 14 gradually, even in the case where the traveling load is suddenly changed or in the case where the traveling operation device is suddenly operated by the operator.

As a result, the controller 30 can prevent the actual traveling trajectory from excessively deviating from the traveling trajectory imagined by the operator, and can smoothly turn the excavator 100.

Figure 5:
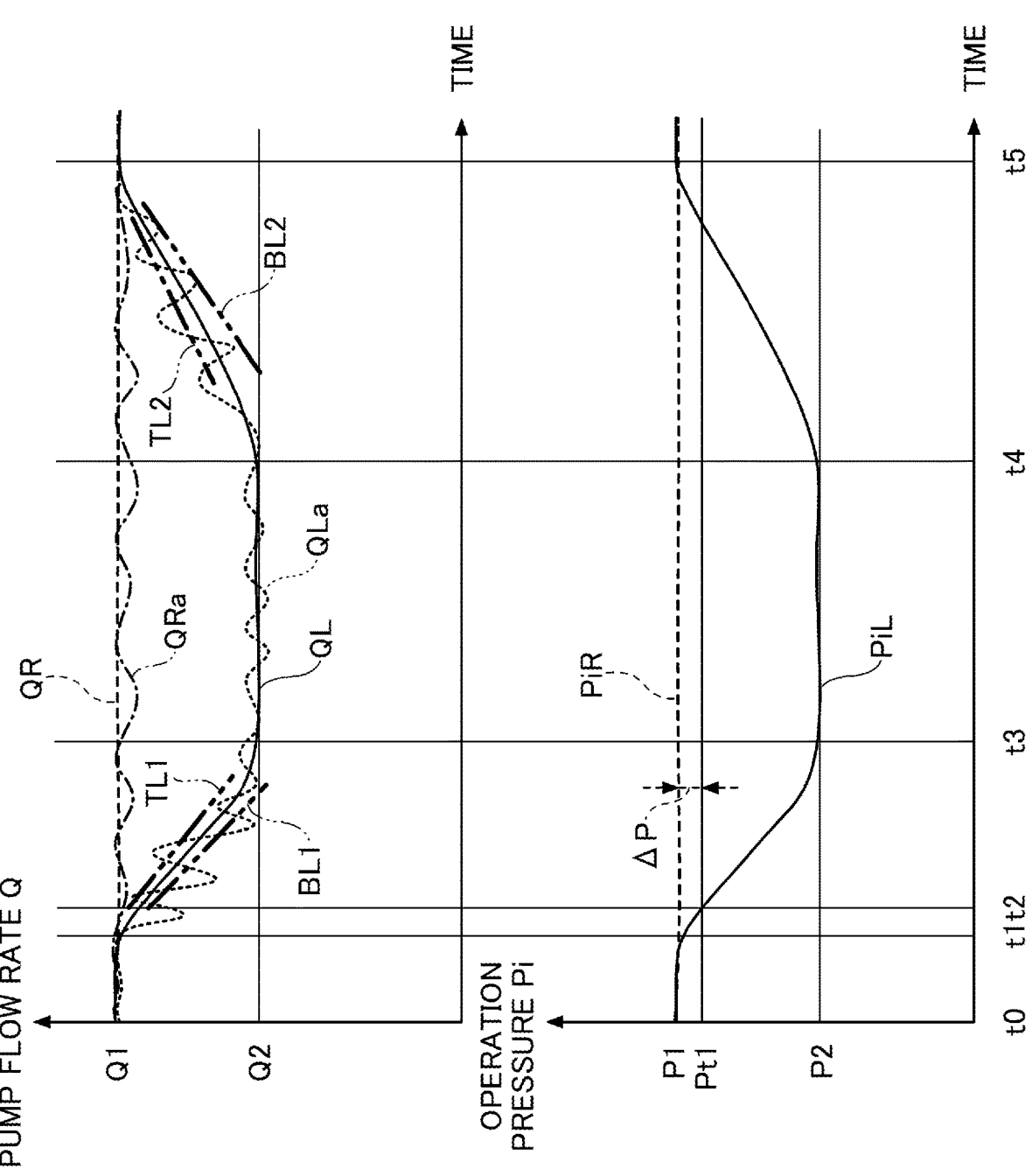
FIG. 5 is a diagram illustrating an example of change over time of a pump flow rate Q and an operation pressure Pi in a single traveling operation state.

Next, with reference to FIG. 5, an example of the change over time of a pump flow rate Q and an operation pressure Pi when the traveling support process is executed will be described. FIG. 5 illustrates an example of the change over time of the pump flow rate Q and the operation pressure Pi in the single traveling operation state. The pump flow rate Q in the single traveling operation state includes a left pump flow rate QL that is the discharge amount of the left main pump 14L supplying the hydraulic oil to the left hydraulic motor for traveling 2ML, and a right pump flow rate QR that is the discharge amount of the right main pump 14R supplying the hydraulic oil to the right hydraulic motor for traveling 2MR. The operation pressure Pi includes a left operation pressure PiL that is a pilot pressure generated by the left traveling lever 26DL (a pilot pressure acting on the pilot port of the control valve 172L), and a right operation pressure PiR that is a pilot pressure generated by the right traveling lever 26DR (a pilot pressure acting on the pilot port of the control valve 172R).

Specifically, the upper diagram in FIG. 5 illustrates the change over time of the pump flow rate Q. In the upper diagram in FIG. 5, a solid line represents the change over time of the left pump flow rate QL in the case where the traveling support process is executed; and a dotted line represents the change over time of the left pump flow rate QLa when the traveling support process is not executed. In addition, in the upper diagram in FIG. 5, a dashed line represents the change over time of the right pump flow rate QR in the case where the traveling support process is executed; and a one-dot chain line represents the change over time of the right pump flow rate QRa when the traveling support process is not executed. A solid line in the lower diagram in FIG. 5 represents the change over time of the left operation pressure PiL for the left traveling lever 26DL, and a dashed line in the lower diagram in FIG. 5 represents the change over time of the right operation pressure PiR for the right traveling lever 26DR.

In the example illustrated in FIG. 5, the operator performs operations for turning the excavator 100 traveling straight in the left direction, and then, causing the excavator 100 to travel straight again. Specifically, at the time t0, the operator makes the amount of operation of the left traveling lever 26DL equivalent to the amount of operation of the right traveling lever 26DR. At this time, the left operation pressure PiL and the right operation pressure PiR both take a value P1, and the left pump flow rate QL and the right pump flow rate QR both take a value Q1.

Thereafter, at the time t1, the operator starts reducing the amount of operation of the left traveling lever 26DL, and continues to reduce the amount of operation of the left traveling lever 26DL at a substantially constant rate until the time t2 is reached. As a result, the left operation pressure PiL comes to take a value Pt1 at the time t2, and comes to take a value P2 at the time t3. During this period, the operator maintains the amount of operation of the right traveling lever 26DR. Therefore, the right operation pressure PiR is maintained at the value P1.

Thereafter, at the time t4, the operator starts increasing the amount of operation of the left traveling lever 26DL, and continues to increase the amount of operation of the left traveling lever 26DL at a substantially constant rate until the time t5 is reached. As a result, the left operation pressure PiL returns to the value P1 at the time t5. In other words, the amount of operation of the left traveling lever 26DL becomes equivalent to the amount of operation of the right traveling lever 26DR. During this period, the operator maintains the amount of operation of the right traveling lever 26DR. Therefore, the right operation pressure PiR is maintained at the value P1.

If it is determined at the time t2 that the difference between the amount of operation of the left traveling lever 26DL and the amount of operation of the right traveling lever 26DR is greater than or equal to the predetermined value, the controller 30 suppresses the amount of change in the pump flow rate command value within the predetermined range as indicated in Step ST4 in FIG. 4. In the example illustrated in FIG. 5, the controller 30 is configured to determine that the difference between the amount of operation of the left traveling lever 26DL and the amount of operation of the right traveling lever 26DR is greater than or equal to the predetermined value, when the difference between the value Pt1 of the left operation pressure PiL and the value P1 of the right operation pressure PiR becomes a predetermined pressure ΔP. In addition, the controller 30 is configured to limit the left pump flow rate command value so as to limit the left pump flow rate QL within a predetermined range defined by an upper limit TL1 indicated by a two-dot chain line and a lower limit BL1 indicated by a two-dot chain line. As a result, the left pump flow rate QL comes to take a value Q2 at the time t3. The right pump flow rate QR remains at the value Q1. Note that the two-dot chain lines merely schematically indicate the change over time of the respective values of the upper limit TL1 and the lower limit BL1, and do not indicate the exact change over time of the respective values.

Specifically, the predetermined range is set such that a difference between the left pump flow rate command value used in the previous control period (referred to as the previous command value, below) and the left pump flow rate command value used in the current control period is less than or equal to a predetermined value.

With this configuration, for example, the controller 30 can appropriately cope with a case where a left pump flow rate command value, which is less than the previous command value and has a difference from the previous command value by the predetermined value or greater, is temporarily calculated in response to a sudden change in the traveling load or a sudden change in the amount of operation. In this case, the controller 30 calculates a value obtained by subtracting the predetermined value from the previous command value as a left pump flow rate command value finally used in the current control period, so as to make the difference between the previous command value and the left pump flow rate command value finally used in the current control period become the predetermined value. In other words, the controller 30 adopts a value corresponding to the lower limit BL1 of the predetermined range as the left pump flow rate command value finally used in the current control period.

Similarly, the controller 30 can appropriately cope with a case where a left pump flow rate command value, which is greater than the previous command value and has a difference from the previous command value by the predetermined value or greater, is temporarily calculated. In this case, the controller 30 calculates a value obtained by adding the predetermined value to the previous command value as a left pump flow rate command value finally used in the current control period, so as to make the difference between the previous command value and the left pump flow rate command value finally used in the current control period become the predetermined value. In other words, the controller 30 adopts a value corresponding to the upper limit TL1 of the predetermined range as the left pump flow rate command value finally used in the current control period.

As a result, the controller 30 can implement the change over time of the left pump flow rate QL that has a smaller change as indicated by the solid line in the upper diagram in FIG. 5, instead of the change over time of the left pump flow rate QLa having a greater change in the case where the traveling support process is not executed as indicated by the dotted line in the upper diagram in FIG. 5.

In addition, the controller 30 can implement the change over time of the right pump flow rate QR that has a smaller change as indicated by the dashed line in the upper diagram in FIG. 5, instead of the change over time of the right pump flow rate QRa having a greater change in the case where the traveling support process is not executed as indicated by the one-dot chain line in the upper diagram in FIG. 5. This is because, in the example illustrated in FIG. 5, the change in the right pump flow rate QR is suppressed by suppressing the change in the left pump flow rate QL.

Note that although the upper and lower limits of the predetermined range are not illustrated for the right pump flow rate QR in the upper diagram in FIG. 5 in contrast to the case of the left pump flow rate QL, the controller 30 is configured to limit the right pump flow rate command value so as to limit the right pump flow rate QR within the predetermined range.

In addition, although the above description with reference to FIG. 5 relates to the change over time of the pump flow rate Q when the excavator 100 traveling straight is turned in the left direction, it can be similarly applied to the change over time of the pump flow rate Q when the excavator 100 turning in the left direction is again caused to travel straight. Specifically, as illustrated the upper diagram in FIG. 5, the controller 30 is configured to limit the left pump flow rate command value so as to limit the left pump flow rate QL within a predetermined range defined by an upper limit TL2 indicated by a two-dot chain line and a lower limit BL2 indicated by a two-dot chain line. Note that the two-dot chain lines merely schematically indicate the change over time of the respective values of the upper limit TL2 and the lower limit BL2, and do not indicate the exact change over time of the respective values.

In addition, the above description with reference to FIG. 5 can be similarly applied to the change over time of the pump flow rate Q when the excavator 100 traveling straight is turned in the right direction, and when the excavator 100 turning in the right direction is again caused to travel straight.

Figure 6:
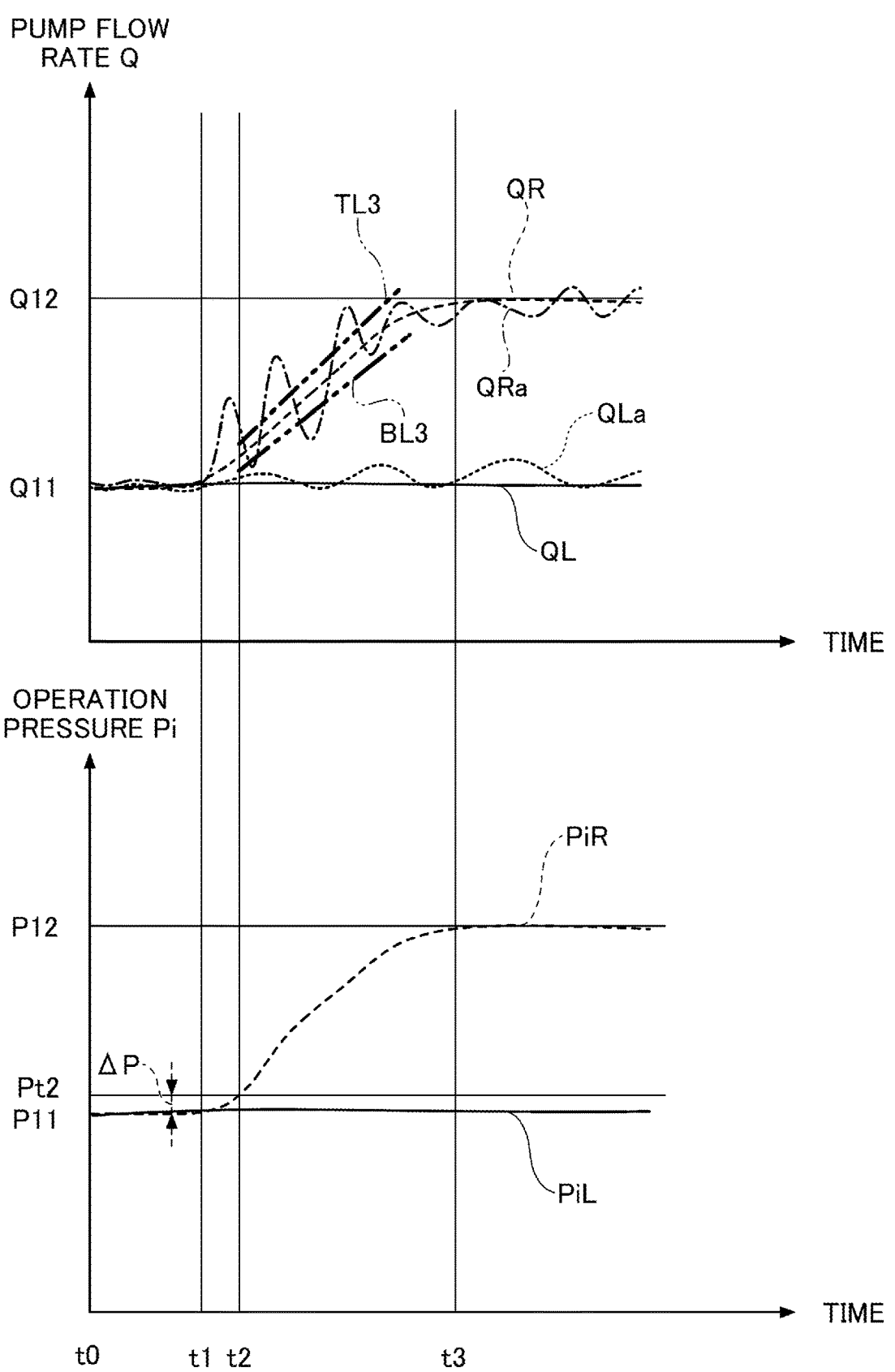
FIG. 6 is a diagram illustrating another example of change over time of the pump flow rate Q and the operation pressure Pi in a single traveling operation state.

Next, with reference to FIG. 6, another example of the change over time of the pump flow rate Q and the operation pressure Pi when the traveling support process is executed will be described. FIG. 6 illustrates the example of the change over time of the pump flow rate Q and the operation pressure Pi in the single traveling operation state, and corresponds to FIG. 5.

In the example illustrated in FIG. 6, the operator performs an operation for turning the excavator 100 traveling straight in the left direction. Specifically, at the time t0, the operator makes the amount of operation of the left traveling lever 26DL equivalent to the amount of operation of the right traveling lever 26DR. At this time, the left operation pressure PiL and the right operation pressure PiR both take a value P11, and the left pump flow rate QL and the right pump flow rate QR both take a value Q11.

Thereafter, at the time t1, the operator starts increasing the amount of operation of the right traveling lever 26DR, and continues to increase the amount of operation of the right traveling lever 26DR at a substantially constant rate until the time t3 is reached. As a result, the right operation pressure PiR comes to take a value Pt2 at the time t2, and comes to take a value P12 at the time t3. During this period, the operator maintains the amount of operation of the left traveling lever 26DL. Therefore, the left operation pressure PiL is maintained at the value P11.

If it is determined at the time t2 that the difference between the amount of operation of the left traveling lever 26DL and the amount of operation of the right traveling lever 26DR is greater than or equal to the predetermined value, the controller 30 suppresses the amount of change in the pump flow rate command value within the predetermined range as indicated in Step ST4 in FIG. 4. In the example illustrated in FIG. 6, the controller 30 is configured to determine that the difference between the amount of operation of the left traveling lever 26DL and the amount of operation of the right traveling lever 26DR is greater than or equal to the predetermined value, when the difference between the value P11 of the left operation pressure PiL and the value Pt2 of the right operation pressure PiR becomes a predetermined pressure LP. In addition, the controller 30 is configured to limit the right pump flow rate command value so as to limit the right pump flow rate QR within a predetermined range defined by an upper limit TL3 indicated by a two-dot chain line and a lower limit BL3 indicated by a two-dot chain line. As a result, the right pump flow rate QR comes to take a value Q12 at the time t3. The left pump flow rate QL remains at the value Q11. Note that the two-dot chain lines merely schematically indicate the change over time of the respective values of the upper limit TL3 and the lower limit BL3, and do not indicate the exact change over time of the respective values. Specifically, the predetermined range is set such that a difference between the previous command value and the right pump flow rate command value used in the current control period is less than or equal to the predetermined value.

With this configuration, for example, the controller 30 can appropriately cope with a case where a right pump flow rate command value, which is greater than the previous command value and has a difference from the previous command value by the predetermined value or greater, is temporarily calculated in response to a sudden change in the traveling load or a sudden change in the amount of operation. In this case, the controller 30 calculates a value obtained by adding the predetermined value to the previous command value as a right pump flow rate command value finally used in the current control period, so as to make the difference between the previous command value and the right pump flow rate command value finally used in the current control period become the predetermined value. In other words, the controller 30 adopts a value corresponding to the upper limit TL3 of the predetermined range as the right pump flow rate command value finally used in the current control period.

Similarly, the controller 30 can also appropriately cope with a case where a right pump flow rate command value, which is less than the previous command value and has a difference from the previous command value by the predetermined value or greater, is temporarily calculated. In this case, the controller 30 calculates a value obtained by subtracting the predetermined value from the previous command value as a right pump flow rate command value finally used in the current control period, so as to make the difference between the previous command value and the right pump flow rate command value finally used in the current control period become the predetermined value. In other words, the controller 30 adopts a value corresponding to the lower limit BL3 of the predetermined range as the right pump flow rate command value finally used in the current control period.

As a result, the controller 30 can implement the change over time of the right pump flow rate QR that has a smaller change as indicated by the dashed line in the upper diagram in FIG. 6, instead of the change over time of the right pump flow rate QRa having a greater change in the case where the traveling support process is not executed as indicated by the one-dot chain line in the upper diagram in FIG. 6.

In addition, the controller 30 can implement the change over time of the left pump flow rate QL that has a smaller change as indicated by the solid line in the upper diagram in FIG. 6, instead of the change over time of the left pump flow rate QLa having a greater change in the case where the traveling support process is not executed as indicated by the dotted line in the upper diagram in FIG. 6. This is because, in the example illustrated in FIG. 6, the change in the left pump flow rate QL is suppressed by suppressing the change in the right pump flow rate QR.

Note that although the upper and lower limits of the predetermined range are not illustrated for the left pump flow rate QL in the upper diagram in FIG. 6 in contrast to the case of the right pump flow rate QR, the controller 30 is configured to limit the left pump flow rate command value so as to limit the left pump flow rate QL within the predetermined range.

In addition, although the above description with reference to FIG. 6 relates to the change over time of the pump flow rate Q when the excavator 100 traveling straight is turned in the left direction, it can be similarly applied to the change over time of the pump flow rate Q when the excavator 100 turning in the left direction is again caused to travel straight. In addition, the above description with reference to FIG. 6 can be similarly applied to the change over time of the pump flow rate Q when the excavator 100 traveling straight is turned in the right direction, and when the excavator 100 turning in the right direction is again caused to travel straight.

Figure 7:
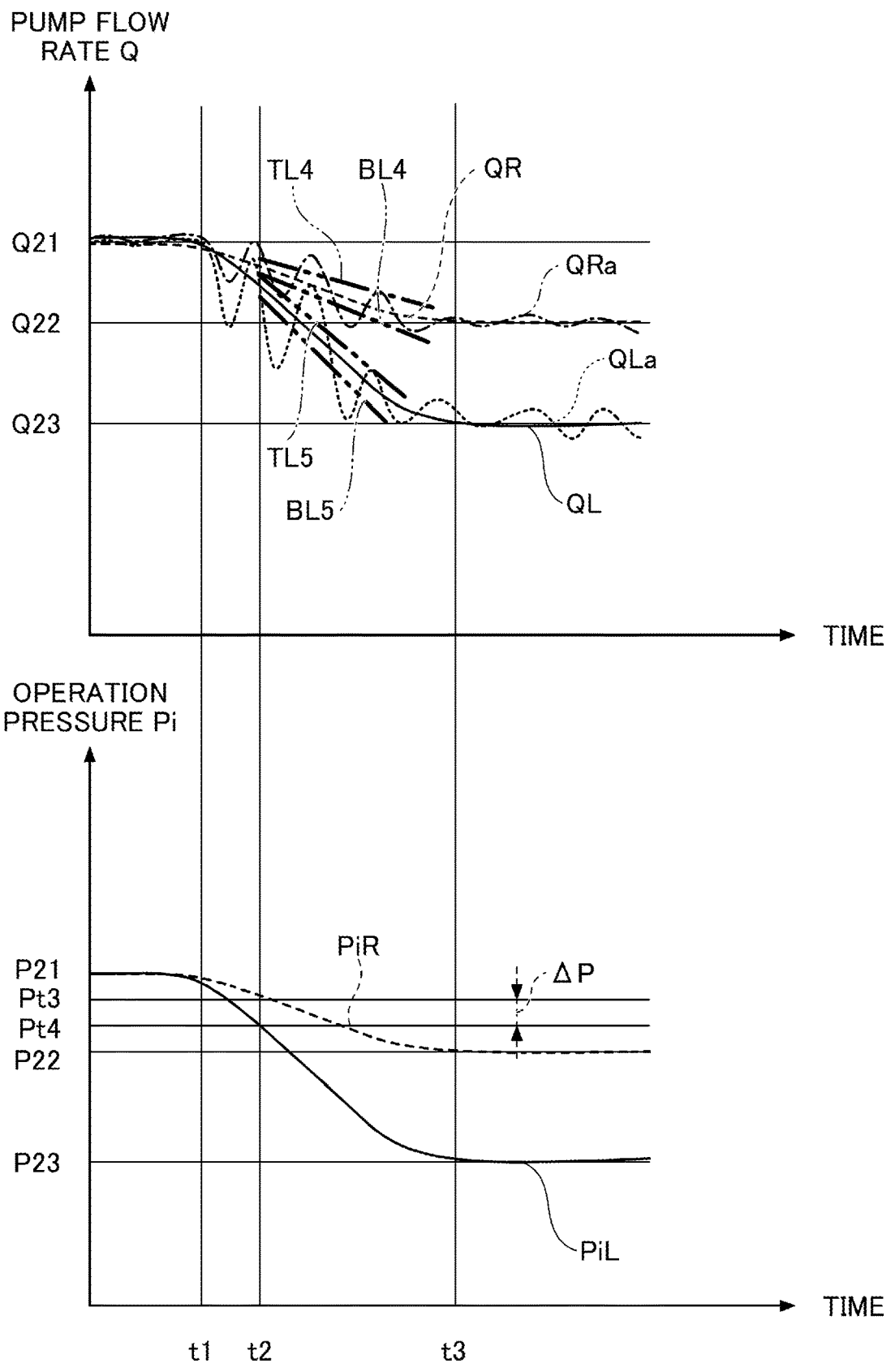
FIG. 7 is a diagram illustrating yet another example of change over time of the pump flow rate Q and the operation pressure Pi in a single traveling operation state.

Next, with reference to FIG. 7, yet another example of the change over time of the pump flow rate Q and the operation pressure Pi when the traveling support process is executed will be described. FIG. 7 is a diagram illustrating an example of the change over time of the pump flow rate Q and the operation pressure Pi in the single traveling operation state, and corresponds to FIG. 6.

In the example illustrated in FIG. 7, the operator performs an operation for turning the excavator 100 traveling straight in the left direction. Specifically, at the time t0, the operator makes the amount of operation of the left traveling lever 26DL equivalent to the amount of operation of the right traveling lever 26DR. At this time, the left operation pressure PiL and the right operation pressure PiR both take a value P21, and the left pump flow rate QL and the right pump flow rate QR both take a value Q21.

Thereafter, at the time t1, the operator starts reducing the amount of operation of the right traveling lever 26DR, and continues to reduce the amount of operation of the right traveling lever 26DR at a substantially constant rate until the time t3 is reached. As a result, the right operation pressure PiR comes to take a value Pt3 at the time t2, and comes to take a value P22 at the time t3. In addition, at the time t1, the operator starts reducing the amount of operation of the left traveling lever 26DL, and continues to reduce the amount of operation of the left traveling lever 26DL at a substantially constant rate until the time t3 is reached. As a result, the left operation pressure PiL comes to take a value Pt4 less than the value Pt3 of the right operation pressure PiR at the time t2, and comes to take a value P23 less than the value P22 of the right operation pressure PiR at the time t3.

If it is determined at the time t2 that the difference between the amount of operation of the left traveling lever 26DL and the amount of operation of the right traveling lever 26DR is greater than or equal to the predetermined value, the controller 30 suppresses the amount of change in the pump flow rate command value within the predetermined range as indicated in Step ST4 in FIG. 4. In the example illustrated in FIG. 7, the controller 30 is configured to determine that the difference between the amount of operation of the left traveling lever 26DL and the amount of operation of the right traveling lever 26DR is greater than or equal to the predetermined value, when the difference between the value Pt4 of the left operation pressure PiL and the value Pt3 of the right operation pressure PiR becomes a predetermined pressure LP. In addition, the controller 30 is configured to limit the right pump flow rate command value so as to limit the right pump flow rate QR within a predetermined range defined by an upper limit TL4 indicated by a two-dot chain line and a lower limit BL4 indicated by a two-dot chain line. In addition, the controller 30 is configured to limit the left pump flow rate command value so as to limit the left pump flow rate QL within a predetermined range defined by an upper limit TL5 indicated by a two-dot chain line and a lower limit BL5 indicated by a two-dot chain line. As a result, the right pump flow rate QR comes to take a value Q22 at the time t3, and the left pump flow rate QL comes to take a value Q23 at the time t3.

Note that the two-dot chain lines merely schematically indicate the change over time of the respective values of the upper limit TL4, the upper limit TL5, the lower limit BL4, and the lower limit BL5, and do not indicate the exact change over time of the respective values.

Specifically, the predetermined range is set such that a difference between the previous command value and the pump flow rate command value used in the current control period is less than or equal to the predetermined value.

With this configuration, for example, the controller 30 can appropriately cope with a case where a pump flow rate command value, which is greater than the previous command value and has a difference from the previous command value by the predetermined value or greater, is temporarily calculated in response to a sudden change in the traveling load or a sudden change in the amount of operation. In this case, the controller 30 calculates a value obtained by adding the predetermined value to the previous command value as a pump flow rate command value finally used in the current control period, so as to make the difference between the previous command value and the pump flow rate command value finally used in the current control period become the predetermined value.

Similarly, the controller 30 can also appropriately cope with a case where a pump flow rate command value, which is less than the previous command value and has a difference from the previous command value by the predetermined value or greater, is temporarily calculated. In this case, the controller 30 calculates a value obtained by subtracting the predetermined value from the previous command value as a pump flow rate command value finally used in the current control period so as to make the difference between the previous command value and the pump flow rate command value finally used in the current control period become the predetermined value.

As a result, the controller 30 can implement the change over time of the right pump flow rate QR that has a smaller change as indicated by the dashed line in the upper diagram in FIG. 7, instead of the change over time of the right pump flow rate QRa having a greater change in the case where the traveling support process is not executed as indicated by the one-dot chain line in the upper diagram in FIG. 7.

In addition, the controller 30 can implement the change over time of the left pump flow rate QL that has a smaller change as indicated by the dotted line in the upper diagram in FIG. 7, instead of the change over time of the left pump flow rate QLa having a greater change in the case where the traveling support process is not executed as indicated by the solid line in the upper diagram in FIG. 7.

Although the above description with reference to FIG. 7 relates to the change over time of the pump flow rate Q when the excavator 100 traveling straight is turned in the left direction, it can be similarly applied to the change over time of the pump flow rate Q when the excavator 100 turning in the left direction is again caused to travel straight. In addition, the above description with reference to FIG. 7 can be similarly applied to the change over time of the pump flow rate Q when the excavator 100 traveling straight is turned in the right direction, and when the excavator 100 turning in the right direction is again caused to travel straight.

As illustrated in FIGS. 5 to 7, for example, even when the pump flow rate command value suddenly changes due to a sudden change in the traveling load, a sudden change in the amount of operation, or the like, the controller 30 can suppress a sudden change in the pump flow rate command value that is finally output to the pump regulator 13. Therefore, for example, in the case where the operator performs an operation for turning, the controller 30 can cause the excavator 100 to turn smoothly.

In addition, the controller 30 can suppress a sudden change in the pump flow rate Q even in the case where the actual traveling trajectory deviates from a traveling trajectory imagined by the operator, and the operator suddenly operates the traveling lever 26D in order to correct the traveling trajectory. Therefore, the controller 30 enables the operator to smoothly correct the traveling trajectory of the excavator 100.

Note that in the case where it is determined as being in the single traveling operation state, the controller 30 may be configured to be capable of suppressing a change in the pilot pressure related to the traveling lever 26D. This is to prevent the pump flow rate Q from suddenly changing when the traveling lever 26D is suddenly operated. For example, in the case where a solenoid valve is provided to be capable of controlling the pilot pressure that is the secondary side pressure of the traveling lever 26D, the controller 30 may control the solenoid valve to suppress a change in the pilot pressure when the traveling lever 26D is suddenly operated.

Figure 8:
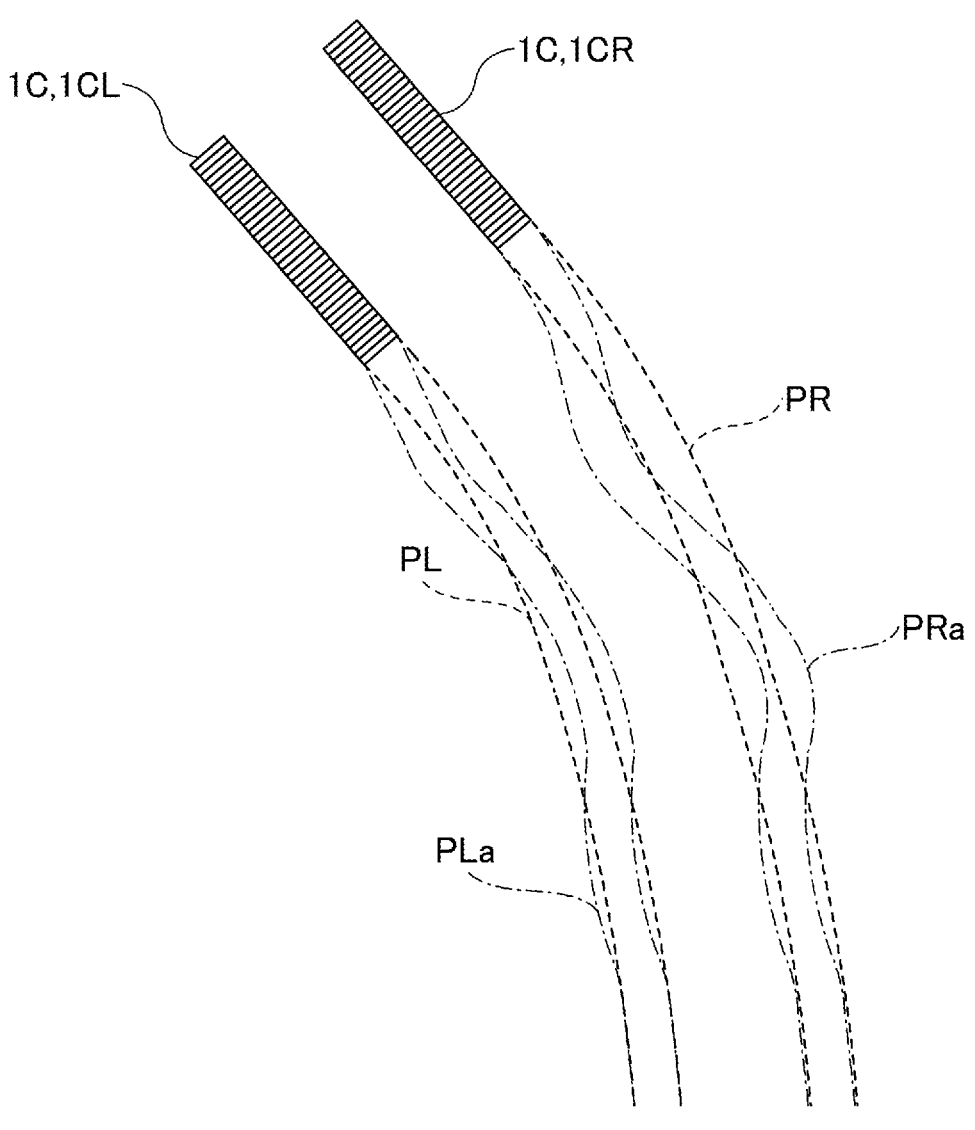
FIG. 8 is a top view of a crawler turning in the left direction.

Next, with reference to FIG. 8, an example of effects of traveling support process will be described. FIG. 8 is a top view of the crawler 1C turning in the left direction. In FIG. 8, for the sake of clarification, members constituting the excavator 100 other than the crawler 1C are not illustrated. A dashed line PL indicates a traveling trajectory of the left crawler 1CL when the traveling support process is executed; and a dashed line PR indicates a traveling trajectory of the right crawler 1CR when the traveling support process is executed. A one-dot chain line PLa indicates a traveling trajectory of the left crawler 1CL when the traveling support process is not executed; and a one-dot chain line PRa indicates a traveling trajectory of the right crawler 1CR when the traveling support process is not executed. Note that the content of the operation on the traveling lever 26D when the traveling support process is executed is the same as the content of the operation on the traveling lever 26D when the traveling support process is not executed.

As indicated by the one-dot chain lines in FIG. 8, the crawler 1C turns in the left direction while meandering when the traveling support process is not executed, but turns in the left direction while drawing smooth arcs when the traveling support process is executed.

In addition, by causing the excavator 100 to turn in the left direction so as to draw smooth arcs, the controller 30 can prevent the traveling distance from becoming unnecessarily long due to meandering or the like. As a result, the controller 30 can obtain an energy saving effect by reducing the fuel consumption or the like.

In addition, the controller 30 prevents the change of the discharge amount of the main pump 14 from becoming excessively large during turning, and thereby, can prevent repetition of increase and decrease of the traveling load due to improper operations of the traveling lever 26D by the operator or the like. Also in this regard, the controller 30 can obtain the energy saving effect.

As described above, the excavator 100 according to the embodiment in the present disclosure includes the traveling lower body 1 including the crawler 1C, the revolving upper body 3 installed on the traveling lower body 1 and capable of revolving, the hydraulic motor for traveling 2M for driving the crawler 1C, the traveling lever 26D as the traveling operation device corresponding to the hydraulic motor for traveling 2M, the main pump 14 as the hydraulic pump for supplying the hydraulic oil to the hydraulic motor for traveling 2M, and the detector for detecting the operation state of the traveling operation device. In addition, the excavator 100 is configured to suppress a change in the flow rate of the hydraulic oil discharged by the main pump 14 according to a detection result of the operation state. The main pump 14 may be an electronically-controlled variable-capacity hydraulic pump. With this configuration, the excavator 100 is capable of turning smoothly.

Note that in the embodiment described above, the crawler 1C includes the left crawler 1CL and the right crawler 1CR. In addition, the traveling lever 26D as a traveling operation device includes a left traveling lever 26DL as a left traveling operation device corresponding to the left crawler 1CL, and a right traveling lever 26DR as a right traveling operation device corresponding to the right crawler 1CR.

Therefore, the excavator 100 may be configured to determine that the traveling lower body 1 is turning in the case where there is a predetermined difference between the amount of operation of the left traveling lever 26DL and the amount of operation of the right traveling lever 26DR, so as to suppress a change in the flow rate of the hydraulic oil discharged by the main pump 14.

For example, the predetermined difference occurs in the case where, with respect to operation amounts of the left traveling lever 26DL and the right traveling lever 26DR, one of the operation amounts is increased; one of the operation amounts is decreased; both of the operation amounts are increased; or both of the operation amounts are decreased.

The excavator 100 may be configured to suppress the amount of change in the pump flow rate command value, which is a command value related to the flow rate of the hydraulic oil discharged by the main pump 14, based on the pressure of the hydraulic oil flowing through the hydraulic circuit, or the amount of operation of the traveling lever 26D. In this case, at least one of the upper limit and the lower limit may be set for the amount of change in the command value.

In the following, with reference to the drawings, another embodiment in the present disclosure will be described.

Conventionally, an excavator that travels using a hydraulic motor as the driving source has been known. In addition, it has been known that such a conventional excavator is provided with a pedal operated by a foot of a driver on a floor plate (floor surface) of a driver's cab, and travels in response to a stepping operation at the front end or a stepping operation at the rear end of the pedal by the driver.

In the case where the driver operates the pedal, the body of the driver is in an unstable state in which the body is mainly supported by the buttocks. Therefore, in the case where the body of the excavator shakes due to unevenness of the ground (road surface), unexpected acceleration, or the like, the body of the driver is shaken, unintended operations such as stepping on the pedal and releasing the foot from the pedal are repeated, and a hunting may occur in the amount of operation. In a conventional excavator, in the case where a hunting occurs in the amount of operation, the pressure of the hydraulic oil discharged by the hydraulic pump changes in response to the hunting. As a result, this makes the body of the excavator to shake more, and the load imposed on the driver increases.

Therefore, in view of the above circumstances, it is desirable to reduce the load imposed on the driver.

As illustrated in FIG. 1, the excavator 100 according to the present embodiment includes the traveling lower body 1, the revolving upper body 3 installed on the traveling lower body 1 and capable of revolving via the revolution mechanism 2, the boom 4, the arm 5, and the bucket 6 that constitute the attachment AT, and the cabin 10.

As will be described later, the traveling lower body 1 (an example of a traveling body) includes a pair of left and right crawlers 1C, to be specific, the left crawler 1CL and the right crawler 1CR. The traveling lower body 1 causes the excavator 100 to travel when the left crawler 1CL and the right crawler 1CR are hydraulically driven by the hydraulic motor for traveling 2M (the left hydraulic motor for traveling 2ML and the right hydraulic motor for traveling 2MR).

The revolving upper body 3 (an example of a revolving body) revolves with respect to the traveling lower body 1 by being driven by hydraulic motor for revolution 2A.

The boom 4 is pivotally attached to the front center of the revolving upper body 3 so as to be capable of being elevated up and down, the arm 5 is pivotally attached to the tip of the boom 4 so as to be capable of being rotated up and down, and the bucket 6 as an end attachment is pivotally attached to the tip of the arm 5 so as to be capable of being rotated up and down. The boom 4, the arm 5, and the bucket 6 are hydraulically driven by the boom cylinder 7, the arm cylinder 8, and the bucket cylinder 9 as hydraulic actuators, respectively.

Note that the bucket 6 is an example of an end attachment, and instead of the bucket 6, another end attachment such as a slope bucket, a dredging bucket, a breaker, or the like may be attached to the tip of the arm 5, depending on the contents of work and the like.

The cabin 10 is a driver's cab in which the operator rides, and is installed on the front left side of the revolving upper body 3.

The excavator 100 causes the actuators to operate in response to an operation performed by the operator riding in the cabin 10, to drive operational elements (driven elements)

such as the traveling lower body 1, the revolving upper body 3, the boom 4, the arm 5, the bucket 6, and the like.

In addition, instead of or in addition to being configured to be operable by the driver in the cabin 10, the excavator 100 may be configured to be remotely controllable by an operator of a predetermined external device (e. g., a support device or a management device).

In this case, the excavator 100 transmits, for example, image information (captured images) output by a space recognition device 70 that will be described later to an external device. In addition, various types of information images (e. g., various types of setting screens and the like) displayed on a display device D1 of the excavator 100 that will be described later may also be displayed on a display device D1 provided in the external device.

Accordingly, the operator can remotely control the excavator 100, for example, while checking contents displayed on the display device D1 provided on the external device. In addition, the excavator 100 may operate the actuators to drive the operational elements such as the traveling lower body 1, the revolving upper body 3, the boom 4, the arm 5, the bucket 6, and the like in response to the remote control signal representing the content of the remote control received from the external device.

The display device D1 of the present embodiment is connected to the controller 30 (a controller), and is provided at a position that is easily visible to the driver seated in the cabin 10 under control of the controller 30, and displays various types of information images. The display device D1 is, for example, a liquid-crystal display, an organic electroluminescence (EL) display, or the like.

The space recognition device 70 of the present embodiment includes a forward sensor 70F attached to the front end of the upper surface of the cabin 10, a backward sensor 70B attached to the rear end of the upper surface of the revolving upper body 3, a leftward sensor 70L attached to the left end of the upper surface of the revolving upper body 3, and a rightward sensor 70R attached to the right end of the upper surface of the revolving upper body 3. In addition, an upward recognition sensor that recognizes an object present in a space above the revolving upper body 3 may be attached to the excavator 100.

The space recognition device 70 may be configured to detect objects present in the surroundings of the excavator 100. The object is, for example, a landform shape (inclination, hole, or the like), an electric wire, a utility pole, a person, an animal, a vehicle, a construction machine, a building, a wall, a helmet, a safety vest, work clothes, a predetermined mark on a helmet, or the like. The space recognition device 70 may be configured to be capable of identifying at least one of the type, position, shape, and the like of the object. The space recognition device 70 may be configured to be capable of distinguishing persons from objects other than persons. The space recognition device 70 may be configured to calculate a distance from the space recognition device 70 or the excavator 100 to an object recognized by the space recognition device 70. The space recognition device 70 is, for example, an ultrasonic sensor, a millimeter wave radar, a monocular camera, a stereo camera, a LIDAR, a distance image sensor, an infrared sensor, or the like.

In the case where the excavator 100 is remotely controlled, the inside of the cabin 10 may be in an unmanned state. In the following description, it is assumed that operations performed by the operator includes at least one of an operation of the operation device 26 (see FIG. 9) by the driver in the cabin 10, and a remote operation of the external device by the driver.

In addition, the excavator 100 may automatically operate a hydraulic actuator regardless of the content of the operation by the driver. Accordingly, the excavator 100 implements functions of automatically operating at least some of the operational elements such as the traveling lower body 1, the revolving upper body 3, the boom 4, the arm 5, and the bucket 6 (hereafter, referred to as "automatic driving functions" or "machine control functions"). The automatic driving function may include a function (what-is-called "half automatic driving function") of automatically operating an operation element (hydraulic actuator) other than the operation element (hydraulic actuator) to be operated in response to the driver's operation or remote control on the operation device 26.

In addition, the automatic driving function may include a function (what-is-called "fully automatic driving function") of automatically operating at least part of the plurality of driven elements (hydraulic actuators) on the assumption that there is no operation or remote control on the operation device 26 by the driver.

In the case where the fully automatic driving function is enabled in the excavator 100, the inside of the cabin 10 may be in an unmanned state. In addition, the automatic driving function may include a function ("gesture operation function") in which the excavator 100 recognizes a gesture of a person such as a worker in the surroundings of the excavator 100 and at least some of the plurality of driven elements (hydraulic actuators) are automatically operated according to the content of the recognized gesture.

In addition, the half automatic driving function, the fully automatic driving function, and the gesture operation function may include a mode in which the operation content of an operation element (hydraulic actuator) as a target of automatic driving is automatically determined according to a predetermined rule. In addition, the half automatic driving function, the fully automatic driving function, and the gesture operation function may include a mode (what-is-called "autonomous driving function") in which the excavator 100 autonomously makes various determinations and the operation content of an operation element (hydraulic actuator) to be autonomously driven is autonomously determined according to the determination result.

Figure 9:
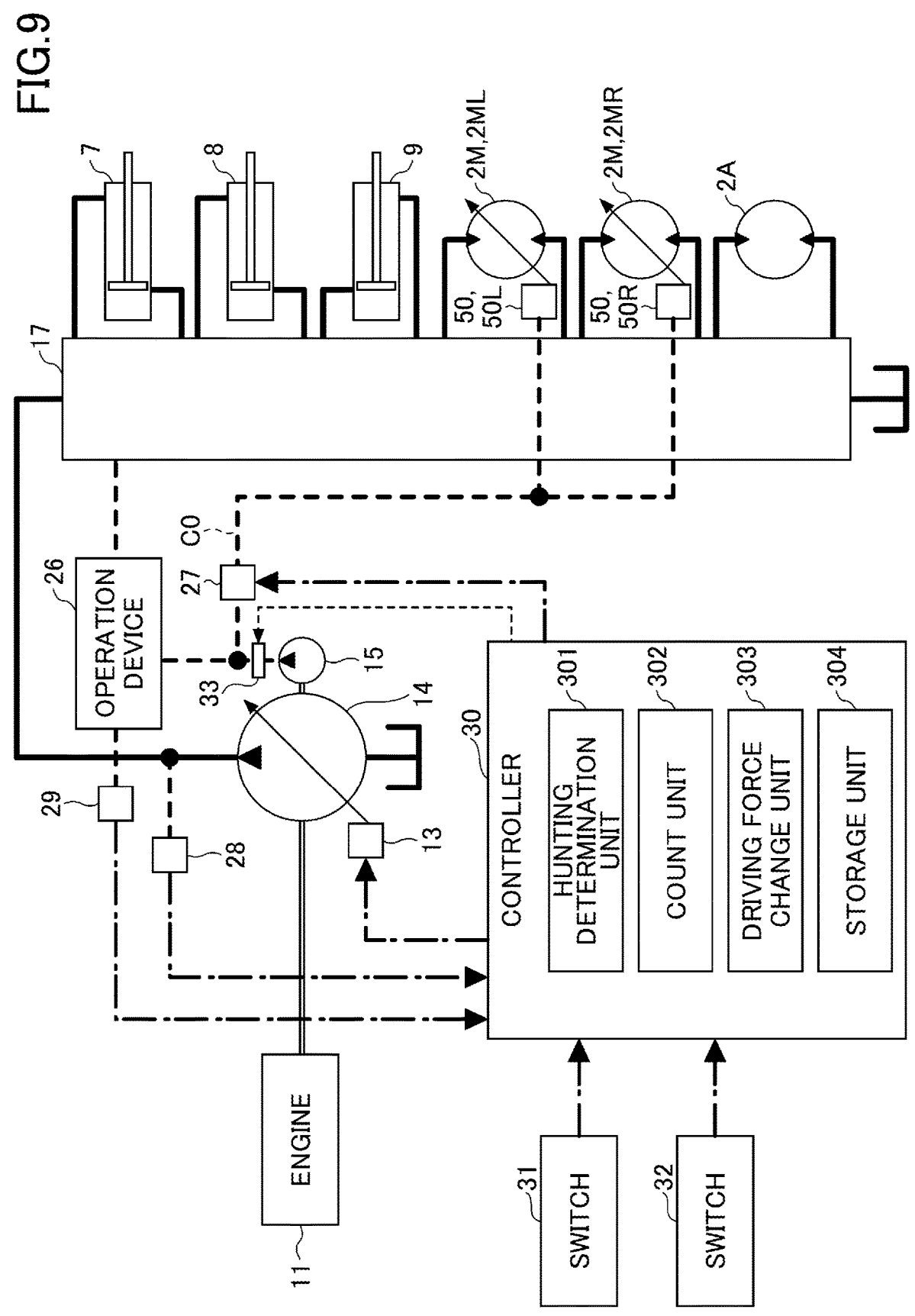
FIG. 9 is a diagram illustrating an example of a configuration of a basic system of a work machine according to the present embodiment.

Next, with reference to FIG. 9, a basic system of the excavator 100 according to the present embodiment will be described. FIG. 9 is a diagram illustrating an example of a configuration of the basic system of machinery according to the present embodiment.

In FIG. 9, mechanical power transmission lines, hydraulic oil lines, pilot lines, and electric control lines are designated with double lines, solid lines, dashed lines, and one-dot chain lines, respectively. The same applies to FIG. 10.

The basic system of the excavator 100 primarily includes an engine 11, a pump regulator 13, a main pump 14, a control pump 15, a control valve unit 17, an operation device 26, a solenoid valve 27, a discharge pressure sensor 28, an operation pressure sensor 29, a controller 30, a switch 31, a switch 32, a motor regulator 50, and the like.

The engine 11 is the driving source of the excavator 100. In the present embodiment, the engine 11 is, for example, a diesel engine that operates to maintain a predetermined number of revolutions, as an internal combustion engine. The output shaft of the engine 11 is coupled with the respective input shafts of the main pump 14 and the control pump 15.

The main pump 14 is a device to supply hydraulic oil to the control valve unit 17 via hydraulic oil lines, and is, for example, a swashplate-type, variable-capacity hydraulic pump.

The pump regulator 13 is a device to control the discharge amount of the main pump 14. In the present embodiment, in response to the discharge pressure of the main pump 14, a commanded current from the controller 30, and the like, the pump regulator 13 adjusts the tilt angle of the swashplate of the main pump 14, so as to control the discharge amount of the main pump 14.

The control pump 15 is a device to supply the hydraulic oil to hydraulic control devices including the operation device 26, and is, for example, a fixed-capacity hydraulic pump.

The control valve unit 17 is a hydraulic control device that controls the hydraulic system in the excavator 100.

Specifically, the control valve unit 17 includes multiple control valves that control the flow of the hydraulic oil discharged by the main pump 14. In addition, the control valve unit 17 can selectively supply the hydraulic oil discharged by the main pumps 14 to one or more hydraulic actuators through the control valves. The control valves control the flow rate of the hydraulic oil flowing from the main pump 14 to the hydraulic actuators, and the flow rate of the hydraulic oil flowing from the hydraulic actuators to a hydraulic oil tank.

The hydraulic actuators include a boom cylinder 7, an arm cylinder 8, a bucket cylinder 9, hydraulic motors for traveling 2M, and the hydraulic motor for revolution 2A. The hydraulic motors for traveling 2M include the left hydraulic motor for traveling 2ML and the right hydraulic motor for traveling 2MR.

The operation device 26 is a device used by the driver for operating the actuators. In the present embodiment, the operation device 26 is a hydraulic type, and supplies the hydraulic oil discharged by the control pump 15 to the pilot port of a control valve corresponding to each of the hydraulic actuators via the pilot line.

In addition, the operation device 26 of the present embodiment is mainly a pedal operated by a foot of the driver. Note that the operation device 26 may include a lever operated by a driver's hand.

The pressure of the hydraulic oil supplied to each of the pilot ports (hereafter, referred to as "pilot pressure") is a pressure corresponding to the operation direction and the amount of operation of the lever or the pedal constituting the operation device 26 corresponding to each of the hydraulic actuators. However, the operation device 26 may be of an electric type.

The solenoid valve 27 is arranged in a pipeline CO between the control pump 15 and the motor regulator 50. In the present embodiment, the solenoid valve 27 is an electromagnetic switching valve for switching between communication and cutoff of the pipeline CO, and operates in response to a command from the controller 30.

A pressure reducing valve 33 is arranged in a pipeline between the control pump 15 and the operation device 26 and the solenoid valve 27. In the present embodiment, the pressure reducing valve 33 reduces the pilot pressure and operates in response to a command from the controller 30.

The discharge pressure sensor 28 is a sensor for detecting the discharge pressure of the main pump 14, and outputs the detected value to the controller 30.

The operation pressure sensor 29 detects an operation content of the driver using the operation device 26. In the present embodiment, the operation pressure sensor 29 is, for example, a pressure sensor that detects the operation direction and the amount of operation of the pedal constituting the operation device 26 corresponding to each of the hydraulic actuators in the form of pressure, and outputs the detected values to the controller 30.

The operation content of the operation device 26 may be detected using an output of a device other than the pressure sensor, such as an operation angle sensor, an acceleration sensor, an angular velocity sensor, a resolver, a voltmeter, an ammeter, or the like. In other words, the amount of operation of the operation device 26 may be represented not only by the operation pressure but also by an operation angle, a twice integrated value of operation acceleration, an integrated value of operation angular velocity, a voltage value, a current value, or the like.

The controller 30 is a control device for controlling the excavator 100. In the present embodiment, the controller 30 is configured with, for example, a computer including a CPU, a volatile storage device, a nonvolatile storage device, and the like. The controller 30 causes the CPU to execute, for example, programs corresponding to various functional elements described later.

The controller 30 executes various processes to be described later based on the outputs of the discharge pressure sensor 28, the operation pressure sensor 29, the switch 31, and the like. The functions of the controller 30 will be described in detail later.

The switch 31 is a switch for switching an operation mode (traveling mode) of the motor regulator 50. In the present embodiment, the switch 31 is a software switch displayed on an in-vehicle display with a touch panel. The switch 31 may be a hardware switch installed in the cabin 10.

The switch 32 is a switch for switching between an operation for raising the cabin 10 and an operation for lowering the cabin 10. The switch 32 may be, for example, a hardware switch installed in the cabin 10, and switches between raising and lowering of the cabin 10 according to an operation. In addition, in the present embodiment, in a state where the switch 32 is not operated, the position of the cabin 10 does not move.

The motor regulator 50 controls the motor volume of the hydraulic motor for traveling 2M. In the present embodiment, the motor regulator 50 includes a left motor regulator 50L and a right motor regulator 50R. By adjusting the tilt angle of the swashplate of the left hydraulic motor for traveling 2ML according to the control pressure of the hydraulic oil supplied through the solenoid valve 27, the left motor regulator 50L controls the motor volume of the left hydraulic motor for traveling 2ML. The same applies to the right motor regulator 50R.

Specifically, by switching the tilt angle of the swashplate of the left hydraulic motor for traveling 2ML in two stages, the left motor regulator 50L can switch the motor volume of the left hydraulic motor for traveling 2ML in two stages of a high rotation setting and a low rotation setting.

The low rotation setting is implemented by increasing the motor volume. In this case, the left hydraulic motor for traveling 2ML operates at a lower rotation speed and a higher torque. The high rotation setting is implemented by reducing the motor volume. In this case, the left hydraulic motor for traveling 2ML operates at a higher rotation speed and a lower torque. The same applies to the right motor regulator 50R.

In the following, the functions of the controller 30 of the present embodiment will be described. The controller 30 of the present embodiment includes a hunting determination unit 301, a count unit 302 (a counter), a driving force change unit 303, and a storage unit 304 (a storage).

The hunting determination unit 301 determines whether a hunting occurs in the amount of operation based on a change in the amount of operation detected by the operation pressure sensor 29. In the case where the operation device 26 is of an electric type, whether a hunting occurs in the amount of operation may be determined based on a change in the operation angle.

Specifically, the hunting determination unit 301 determines that a hunting occurs in the case where periodic increases and decreases are detected in the amount of operation detected by the operation pressure sensor 29. Details of the hunting will be described later.

The count unit 302 counts the number of times that the hunting determination unit 301 determines that a hunting occurs in a predetermined period, and holds the count value. In addition, the count unit 302 resets the count value every time a predetermined period elapses. The predetermined period is a period set in advance.

The driving force change unit 303 changes the driving force of the hydraulic motor for traveling 2M according to the number of huntings counted by the count unit 302 in the predetermined period.

Specifically, the driving force change unit 303 changes the driving force of the hydraulic motor for traveling 2M according to the number of huntings by referring to the information stored in the storage unit 304 in which the number of occurrences of huntings is associated with the manner of changing the driving force. In the following description, the information stored in the storage unit 304 may be referred to as information on association.

In other words, the driving force of the hydraulic motor for traveling 2M in the present embodiment is the driving pressure of the hydraulic motor for traveling 2M.

The driving pressure of the hydraulic motor for traveling 2M in the present embodiment may be, for example, the maximum value of the discharge amount of the main pump 14. In other words, the maximum value of the discharge amount of the main pump 14 is the maximum displacement volume of the main pump 14.

In addition, the driving pressure of the hydraulic motor for traveling 2M in the present embodiment may be the driving pressure of the hydraulic motor for traveling 2M. In other words, the driving pressure of the hydraulic motor for traveling 2M is the maximum displacement volume of the hydraulic motor for traveling 2M, and is controlled by adjusting the tilt angle of the swashplate of the hydraulic motor for traveling 2M with the motor regulator 50.

The driving force change unit 303 of the present embodiment refers to the count value held by the count unit 302 and the information on association, and decreases or increases the maximum value of the discharge amount of the main pump 14 according to the number of huntings occurring in a predetermined period. In other words, the driving force change unit 303 decreases or increases the maximum displacement volume of the main pump 14 or the hydraulic motor for traveling 2M according to the number of huntings occurring in a predetermined period. In this way, the driving force change unit 303 decreases or increases the maximum displacement volume of the main pump 14 or the hydraulic motor for traveling 2M, to suppress a change in the pressures of the hydraulic oil discharged by the main pump 14.

In addition, although an example in which the driving force change unit 303 controls the main pump 14 or the hydraulic motor for traveling 2M according to the determination result of the hunting determination unit 301 has been described, the present inventive concept is not necessarily limited as such. For example, in the case where an operation control valve (proportional valve) that operates in response to an electric signal from the controller 30 is arranged between the control pump 15 and a pilot port of a control valve, the driving force change unit 303 may control the operation control valve in response to the determination result of the hunting determination unit 301.

Further, in the case where the electromagnetic solenoid spool valve is used as the control valve, the driving force change unit 303 may control the electromagnetic solenoid spool valve according to the determination result of the hunting determination unit 301. In this way, operation control valves, electromagnetic solenoid spool valves, and the like can also be used for changing the driving force of the hydraulic motor for traveling.

The storage unit 304 of the present embodiment stores the information on association in advance. Specifically, for example, the information on association may be information representing the discharge amount of the main pump 14 to be decreased or increased with respect to one hunting. In addition, the information on association may be, for example, information representing the maximum displacement volume of the hydraulic motor for traveling 2M to be decreased or increased with respect to one hunting.

Further, the information on association may be a function indicating a relationship between the number of huntings and the maximum value of the discharge amount of the main pump 14. In addition, the information on association may be a function indicating a relationship between the number of huntings and the maximum displacement volume of the hydraulic motor for traveling 2M.

Figure 10:
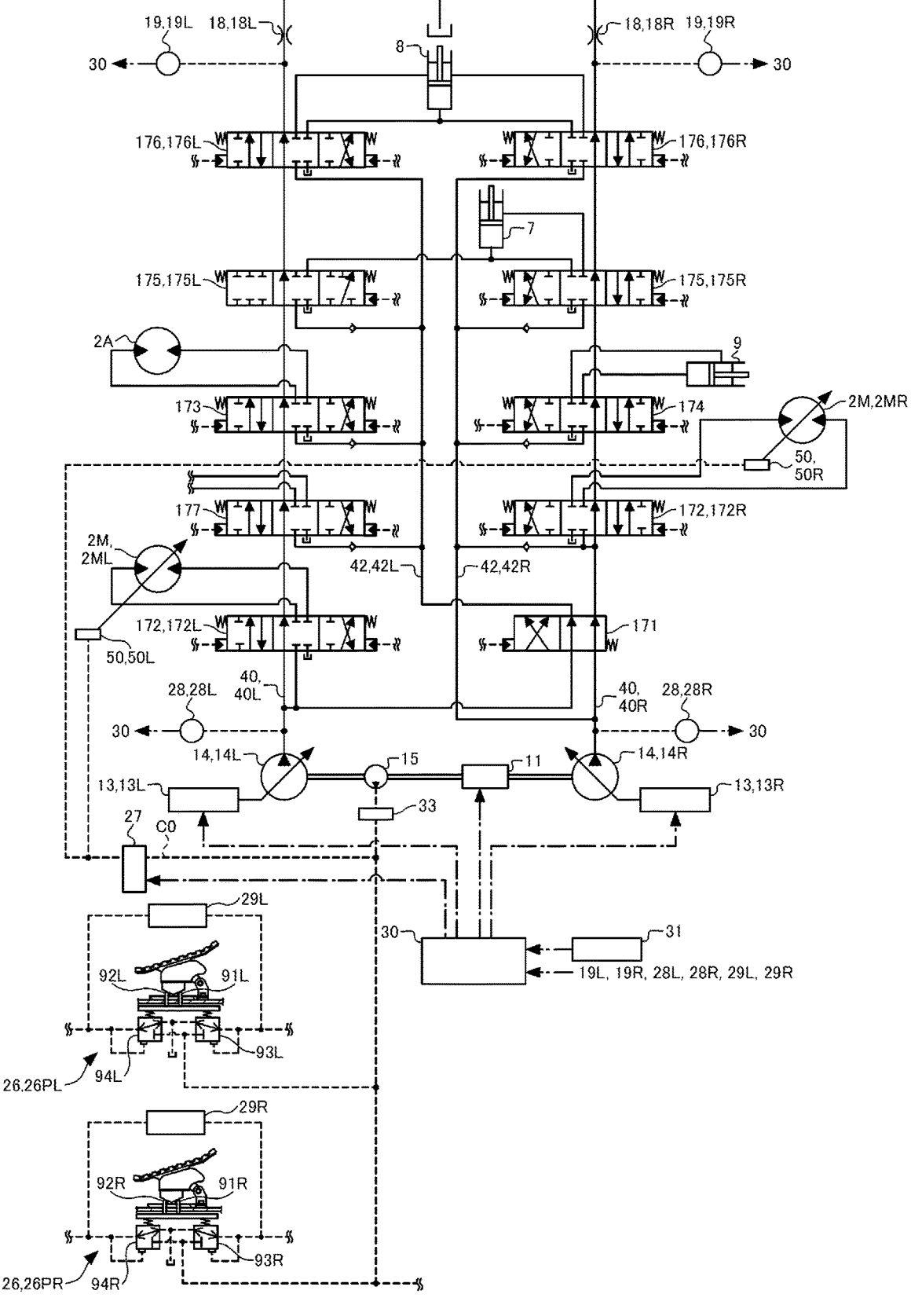
FIG. 10 is a schematic diagram illustrating an example of a configuration of a hydraulic system installed on the excavator in FIG.

Next, with reference to FIG. 10, the hydraulic system installed on the excavator 100 will be described. FIG. 10 is a schematic diagram illustrating an example of a configuration of a hydraulic system installed on the excavator in FIG. 1. The hydraulic system in FIG. 10 circulates the hydraulic oil from the left main pump 14L and the right main pump 14R driven by the engine 11 to a hydraulic oil tank via a left center bypass pipeline 40L, a right center bypass pipeline 40R, a left parallel pipeline 42L, and a right parallel pipeline 42R. The left main pump 14L and the right main pump 14R correspond to the main pump 14 in FIG. 9.

The left center bypass pipeline 40L is a hydraulic oil line passing through the control valves 172L, 177, 173, 175L, and 176L arranged in the control valve unit 17. The right center bypass pipeline 40R is a hydraulic oil line passing through the control valves 171, 172R, 174, 175R, and 176R arranged in the control valve unit 17.

The control valve 172L is a spool valve to supply the hydraulic oil discharged by the left main pump 14L to the left hydraulic motor for traveling 2ML, and to switch the flow of the hydraulic oil discharged by the left hydraulic motor for traveling 2ML so as to discharge the hydraulic oil into the hydraulic oil tank.

The control valve 171 is a spool valve as a straight travel valve. The control valve 171 switches the flow of the hydraulic oil so as to supply the hydraulic oil from the left main pump 14L to each of the left hydraulic motor for traveling 2ML and the right hydraulic motor for traveling 2MR, in order to increase the straightness of the traveling lower body 1. Specifically, in the case where the hydraulic motor for traveling 2M and any of the other hydraulic actuators are operated at the same time, the control valve 171 is switched so that the left main pump 14L can supply the hydraulic oil to both the left hydraulic motor for traveling 2ML and the right hydraulic motor for traveling 2MR.

In the case where none of the other hydraulic actuators is operated, the control valve 171 is switched so that the left main pump 14L can supply the hydraulic oil to the left hydraulic motor for traveling 2ML, and the right main pump 14R can supply the hydraulic oil to the right hydraulic motor for traveling 2MR.

The control valve 177 is a spool valve to supply the hydraulic oil discharged by the left main pump 14L to an optional hydraulic actuator, and to switch the flow of the hydraulic oil discharged by the optional hydraulic actuator so as to discharge the hydraulic oil into the hydraulic oil tank. The optional hydraulic actuator is, for example, a grapple open/close cylinder.

The control valve 172R is a spool valve to supply the hydraulic oil discharged by the right main pump 14R to the right hydraulic motor for traveling 2MR, and to switch the flow of the hydraulic oil discharged by the right hydraulic motor for traveling 2MR so as to discharge the hydraulic oil into the hydraulic oil tank.

The control valve 173 is a spool valve to supply the hydraulic oil discharged by the left main pump 14L to the hydraulic motor for revolution 2A, and to switch the flow of the hydraulic oil discharged by the hydraulic motor for revolution 2A so as to discharge the hydraulic oil into the hydraulic oil tank.

The control valve 174 is a spool valve to supply the hydraulic oil discharged by the right main pump 14R to the bucket cylinder 9, and to discharge the hydraulic oil in the bucket cylinder 9 into the hydraulic oil tank.

The control valves 175L and 175R are spool valves to supply the hydraulic oil discharged by the left main pump 14L and the right main pump 14R to the boom cylinder 7, and to switch the flow of the hydraulic oil so as to discharge the hydraulic oil in the boom cylinder 7 into the hydraulic oil tank. In the present embodiment, the control valve 175L operates only in the case where an up operation of the boom 4 is executed, and does not operate in the case where a down operation of the boom 4 is executed.

The control valves 175L and 175R are spool valves to supply the hydraulic oil discharged by the left main pump 14L and the right main pump 14R to the arm cylinder 8, and to switch the flow of the hydraulic oil so as to discharge the hydraulic oil in the arm cylinder 8 into the hydraulic oil tank.

The left parallel pipeline 42L is a hydraulic oil line parallel to the left center bypass pipeline 40L. The left parallel pipeline 42L can supply the hydraulic oil to a further downstream control valve in the case where the flow of the hydraulic oil through the left center bypass pipeline 40L is restricted or cut off by any of the control valves 172L, 177, 173, and 175L. The right parallel pipeline 42R is a hydraulic oil line parallel to the right center bypass pipeline 40R. The right parallel pipeline 42R can supply the hydraulic oil to a downstream control valve in the case where the flow of the hydraulic oil through the right center bypass pipeline 40R is restricted or cut off by one of the control valves 172R, 174, and 175R.

The left pump regulator 13L and the right pump regulator 13R adjust the tilt angles of the swashplates of the left main pump 14L and the right main pump 14R, respectively, in response to the respective discharge pressure of the left main pump 14L and the right main pump 14R, so as to control the discharge amounts of the left main pump 14L and the right main pump 14R. The left pump regulator 13L and the right pump regulator 13R correspond to the pump regulator 13 in FIG. 9. The left pump regulator 13L or the right pump regulator 13R adjusts the tilt angle of the swashplate of the left main pump 14L or the right main pump 14R, for example, in the case of an increase in the discharge pressure of the left main pump 14L or the right main pump 14R, so as to reduce the discharge amount. This is to control the absorbed horsepower of the main pump 14, which is expressed by a product of the discharge pressure and the discharge volume, so as not to exceed the output horsepower of the engine 11.

The left traveling operation device 26PL and the right traveling operation device 26PR are examples of the operation device 26. The left traveling operation device 26PL is a pedal device used for operating the left hydraulic motor for traveling 2ML. The left traveling operation device 26PL applies a pilot pressure corresponding to the amount of operation to the pilot port of the control valve 172L by using the hydraulic oil discharged by the control pump 15. Specifically, the left traveling operation device 26PL causes the pilot pressure to act on the left-side pilot port of the control valve 172L in the case of being operated in the forward direction, and causes the pilot pressure to act on the right-side pilot port of the control valve 172L in the case of being operated in the backward direction.

The left traveling operation device 26PL includes lifting pins 91L and 92L that are fixed to and supported by a floor plate, to be lifted and lowered in conjunction with rotation of a rotatable rotating body. Each of the lifting pins 91L and 92L is biased upward by a spring or the like. In the left traveling operation device 26PL, for example, in the case of being operated in the forward direction, the tip of the lifting pin 91L pushes down a remote control valve 93L, and in the case of being operated in the backward direction, the tip of the lifting pin 92L pushes down a remote control valve 94L.

The right traveling operation device 26PR is used for operating the right hydraulic motor for traveling 2MR. The right traveling operation device 26PR applies a pilot pressure corresponding to the amount of operation to the pilot port of the control valve 172R by using the hydraulic oil discharged by the control pump 15. Specifically, the right traveling operation device 26PR causes the pilot pressure to act on the right pilot port of the control valve 172R in the case of being operated in the forward direction, and causes the pilot pressure to act on the left pilot port of the control valve 172R in the case of being operated in the backward direction.

The right traveling operation device 26PR includes lifting pins 91R and 92R that are fixed to and supported by a floor plate and are lifted and lowered in conjunction with rotation of a rotatable rotating body. Each of the lifting pins 91R and 92R is biased upward by a spring or the like. In the right traveling operation device 26PR, for example, in the case of being operated in the forward direction, the tip of the lifting pin 91R pushes down a remote control valve 93R, and in the case of being operated in the backward direction, the tip of the lifting pin 92R pushes down a remote control valve 94R.

The solenoid valve 27 causes the control pump 15 to communicate with the motor regulator 50 in the case of receiving a communication command from the controller 30. In this case, the motor regulator 50 operates in a forced fixed mode. On the other hand, in the case of not receiving a communication command from the controller 30, the solenoid valve 27 cuts off communication between the control pump 15 and the motor regulator 50. In this case, the motor regulator 50 operates in a variable mode.

The pressure reducing valve 33 controls a stroke amount (movement amount) of a spool included in each of the control valves 172L and 172R in response to a command from the controller 30. In the present embodiment, in the case where the flow rate reduction process is executed by the hydraulic motor for traveling 2M, the main pump 14, the engine 11, and the like, the pressure reducing valve 33 is not required necessarily.

The discharge pressure sensors 28L and 28R are examples of the discharge pressure sensor 28 in FIG. 9. The discharge pressure sensor 28L detects the discharge pressure of the left main pump 14L, and outputs the detected value to the controller 30. The discharge pressure sensor 28R detects the discharge pressure of the right main pump 14R, and outputs the detected value to the controller 30.

The operation pressure sensors 29L and 29R are examples of the operation pressure sensor 29 in FIG. 9. Specifically, the operation pressure sensors 29L and 29R are examples of detectors that detect the operation state of the traveling operation device. The operation pressure sensor 29L detects an operation content of the driver on the left traveling operation device 26PL in the form of pressure, and outputs the detected value to the controller 30. The operation pressure sensor 29R detects an operation content of the driver on the right traveling operation device 26PR in the form of pressure, and outputs the detected value to the controller 30.

In addition, the operation devices 26 (the left traveling operation device 26PL, the right traveling operation device 26PR, the left traveling lever 26DL, the right traveling lever 26DR, etc.) may be of an electric type that outputs an electric signal (hereafter, referred to as "operation signal") instead of a hydraulic pilot type that outputs a pilot pressure. In this case, the electric signal (operation signal) from the operation device 26 is input into the controller 30, the controller 30 controls each of the control valves 171 to 177 in the control valve unit 17 according to the input electric signal, and thereby, operations of various hydraulic actuators are implemented according to the operation content on the operation device 26. For example, the control valves 171 to 177 in the control valve unit 17 may be electromagnetic solenoid spool valves that are driven by commands from the controller 30. In addition, for example, between the control pump 15 and the pilot port of each of the control valves 171 to 177, a hydraulic control valve (hereafter, referred to as an "operation control valve") that operates in response to an electric signal from the controller 30 may be arranged. The operation control valve may be, for example, a proportional valve. In this case, in the case where a manual operation using an electric operation device 26 is executed, the controller 30 controls the operation control valve by an electric signal corresponding to the amount of operation (e. g., an amount of lever operation) to increase or decrease the pilot pressure, and thereby, can cause each of the control valves 171 to 177 to operate according to the operation content on the operation device 26.

A boom operation lever, an arm operation lever, a bucket operation lever, and a revolution operation lever (none of these illustrated) are operation devices for operating up and down the boom 4, opening and closing the arm 5, opening and closing the bucket 6, and revolving the revolving upper body 3, respectively. Like the left traveling operation device 26PL, these operation devices use the hydraulic oil discharged by the control pump 15 to apply a pilot pressure corresponding to the amount of lever operation to either the left or right pilot port of a control valve corresponding to each of the hydraulic actuators. In addition, an operation content of the driver on each of these operation devices is detected in the form of pressure by the corresponding operation pressure sensor in substantially the same way as by the operation pressure sensor 29L, and the detected value is output to the controller 30.

Here, negative control adopted in the hydraulic system in FIG. 10 will be described.

The left center bypass pipeline 40L and the right center bypass pipeline 40R are provided with a left throttle 18L and a right throttle 18R, respectively, between the respective control valves 176L and 176R located most downstream, and the hydraulic oil tank. The flows of the hydraulic oil discharged by the left main pump 14L and the right main pump 14R are restricted by the left throttle 18L and the right throttle 18R, respectively. In addition, the left throttle 18L and the right throttle 18R generate respective control pressures for controlling the left pump regulator 13L and the right pump regulator 13R.

The left control pressure sensor 19L and the right control pressure sensor 19R are sensors for detecting the control pressures generated upstream of the left throttle 18L and the right throttle 18R, respectively. In the present embodiment, the left control pressure sensor 19L and the right control pressure sensor 19R output respective detected values to the controller 30.

The controller 30 outputs commands corresponding to the control pressures to the left pump regulator 13L and the right pump regulator 13R. In response to the commands, the left pump regulator 13L and the right pump regulator 13R adjust the respective tilt angles of the swashplates of the left main pump 14L and the right main pump 14R, so as to control the discharge amounts of the left main pump 14L and the right main pump 14R. Specifically, the left pump regulator 13L and the right pump regulator 13R decrease the respective discharge amounts of the left main pump 14L and the right main pump 14R to be smaller while the control pressure becomes greater, and increase the discharge amounts of the left main pump 14L and the right main pump 14R to be greater while the control pressure becomes smaller.

In a case where none of the hydraulic actuators is being operated, the hydraulic oil discharged by the left main pump 14L and the right main pump 14R reaches the left throttle 18L and the right throttle 18R through the left center bypass pipeline 40L and the right center bypass pipeline 40R, respectively. Then, the flows of the hydraulic oil discharged by the left main pump 14L and the right main pump 14R increase the control pressures generated upstream of the left throttle 18L and the right throttle 18R, respectively. As a result, the left pump regulator 13L and the right pump regulator 13R decrease the discharge amounts of the left main pump 14L and the right main pump 14R, respectively, down to the minimum allowable discharge amount, to suppress pressure loss (pumping loss) when the discharged hydraulic oil passes through the left center bypass pipeline 40L and the right center bypass pipeline 40R, respectively.

On the other hand, in the case where one of the hydraulic actuators is being operated, the hydraulic oil discharged by the left main pump 14L and the right main pump 14R flows into the hydraulic actuator to be operated through a control valve corresponding to the hydraulic actuator to be operated. Then, the flows of the hydraulic oil discharged by the left main pump 14L and the right main pump 14R reduce or eliminate the amounts to reach the left throttle 18L and the right throttle 18R, respectively, which reduce the control pressure generated upstream of the left throttle 18L and the right throttle 18R, respectively. As a result, the left pump regulator 13L and the right pump regulator 13R increase the discharge amounts of the left main pump 14L and the right main pump 14R, to cause a sufficient amount of the hydraulic oil to circulate in the hydraulic actuator to be operated, so as to securely drive the hydraulic actuator to be operated.

With the configuration as described above, the hydraulic system in FIG. 10 can suppress wasteful energy consumption in each of the left main pump 14L and the right main pump 14R in the case where none of the hydraulic actuators is being operated. The wasteful energy consumption includes pumping loss generated in the left center bypass pipeline 40L and the right center bypass pipeline 40R by the hydraulic oil discharged by the left main pump 14L and the right main pump 14R. In the case where a hydraulic actuator is being operated, it is configured to securely supply a necessary and sufficient amount of the hydraulic oil from each of the left main pump 14L and the right main pump 14R to the hydraulic actuator to be operated.

Figure 11A:
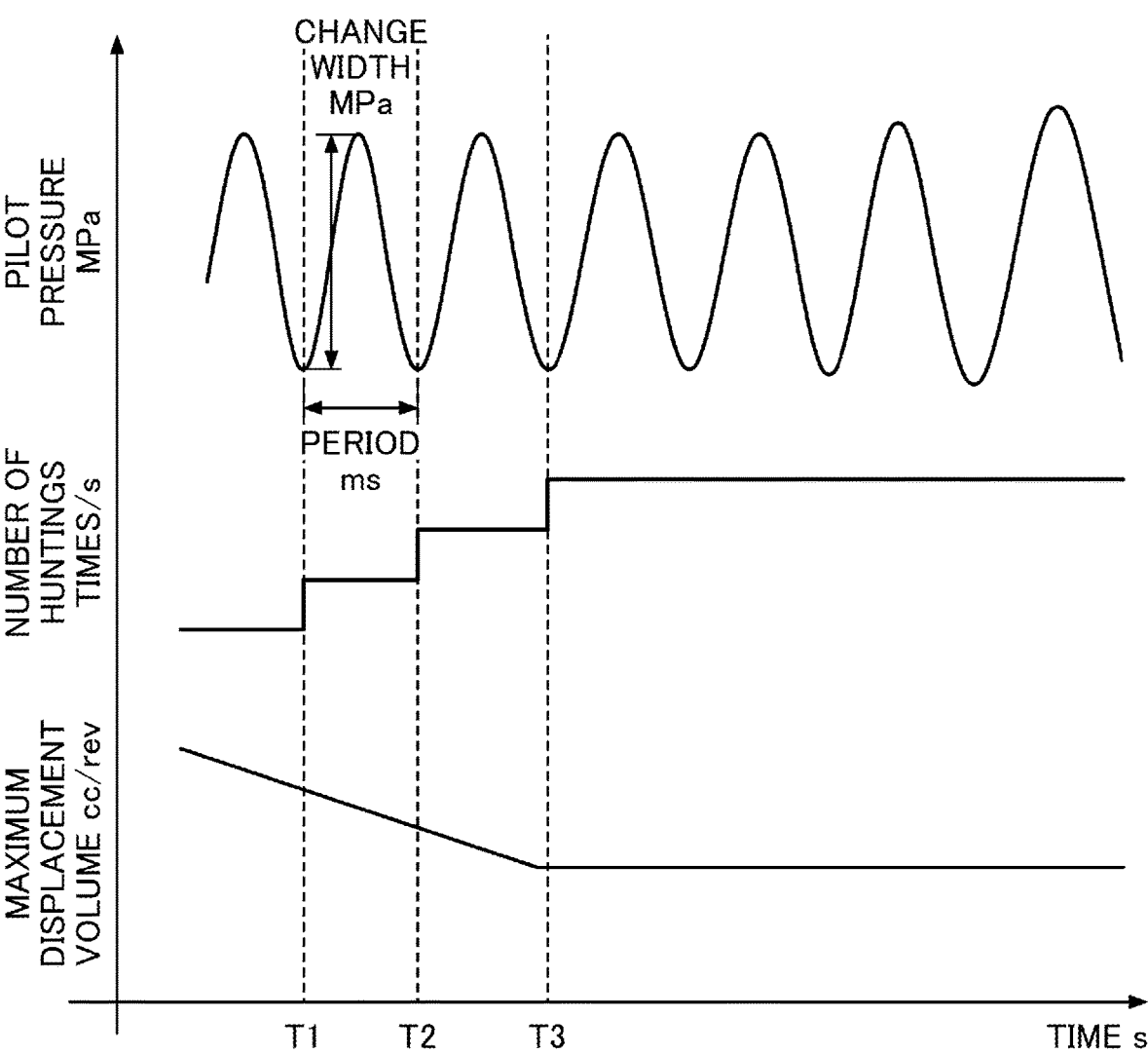
FIG. 11A is a diagram illustrating hunting and information on association.
Figure 11B:
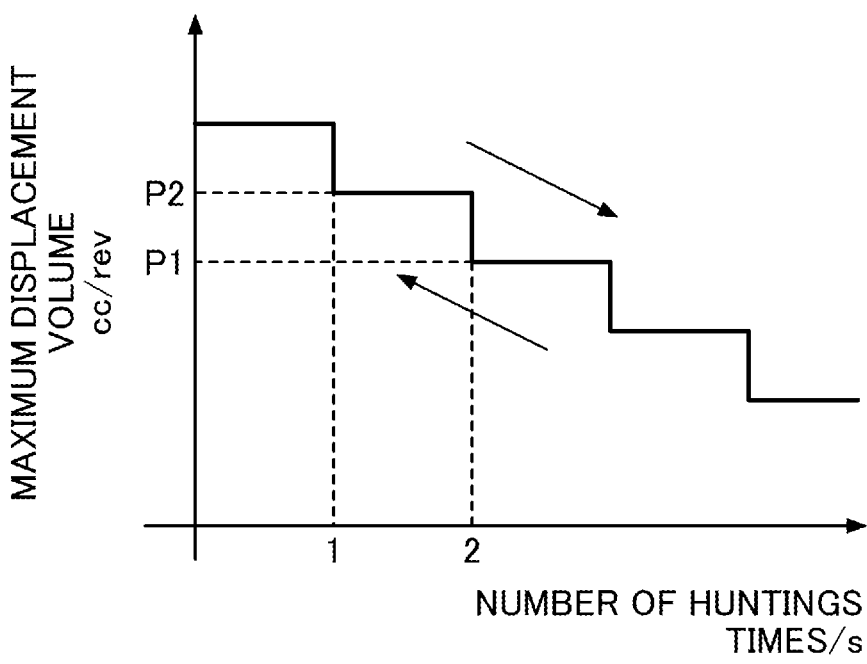
FIG. 11B is a diagram illustrating hunting and information on association.

Next, with reference to FIGS. 11A and 11B, the hunting in the present embodiment and the information on association will be described. FIGS. 11A and 11B are diagrams illustrating huntings and information on association.

FIG. 11A illustrates a relationship between a change in the amount of operation detected by the operation pressure sensor 29, the number of huntings, and the driving force of the hydraulic motor for traveling 2M. Note that in the example in FIG. 11A, the amount of operation detected by the operation pressure sensor 29 is the pilot pressure, and the driving force of the hydraulic motor for traveling 2M is the maximum displacement volume of the main pump 14.

In the present embodiment, in the case where a change width of the pilot pressure is a predetermined value, and a period in which the pilot pressure changes is a predetermined interval, it is determined that a hunting occurs in the amount of operation.

In the example in FIG. 11A, the interval from time T1 to time T2 is a predetermined interval, and the change width of the pilot pressure during this interval is the predetermined value; therefore, it is counted that a hunting occurs once during the interval from time T1 to time T2. In other words, in the present embodiment, in the case where the amplitude (change width) of the waveform indicating the pilot pressure is the predetermined value, and the predetermined interval is one period, the one period is counted as one hunting.

In addition, in FIG. 11A, also in the predetermined interval from the time T2 to the time T3, the change width of the pilot pressure is the predetermined value; therefore, the number of huntings that occur between the time T1 and the time T3 is two.

In the present embodiment, the maximum displacement volume of the main pump 14 is set to a value corresponding to the number of huntings.

FIG. 11B is a diagram illustrating an example of information on association stored in the storage unit 304. In the example in FIG. 11B, the number of huntings in the predetermined period is associated with the maximum displacement volume of the main pump 14 as the information on association.

Note that in the example of FIG. 11B, it is assumed that the predetermined period is set to one second, and the count unit 302 holds the number of huntings detected by the hunting determination unit 301 as a count value every one second. Therefore, the count value of the count unit 302 is reset every second.

In the case where the number of huntings is two, the driving force change unit 303 refers to the information on association in FIG. 11B, and sets the maximum displacement volume of the main pump 14 to a value obtained by reducing the displacement volume corresponding to two times of huntings.

Figure 12:
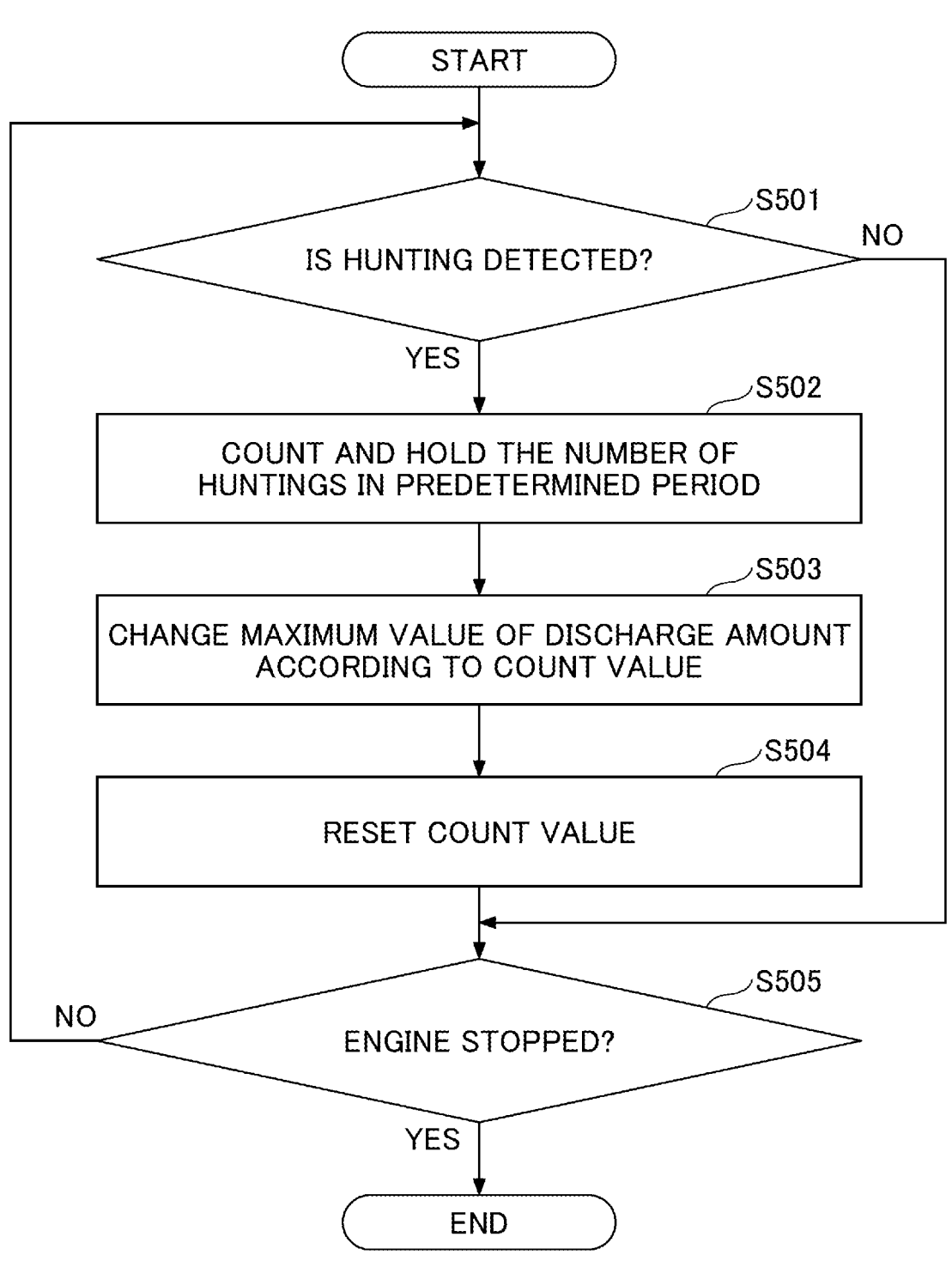
FIG. 12 is a flow chart illustrating operations of an excavator.

Next, with reference to FIG. 12, operations of the excavator 100 of the present embodiment will be described. FIG. 12 is a flow chart illustrating operations of the excavator.

In the excavator 100 of the present embodiment, the hunting determination unit 301 of the controller 30 determines whether a hunting occurs (Step S501). At Step S501, if a hunting is not detected, the controller 30 proceeds to Step S505 that will be described later.

At Step S501, in the case where a hunting is detected, the controller 30 causes the count unit 302 to count the number of huntings in the predetermined period, and holds the count value (Step S502).

Next, the controller 30 causes the driving force change unit 303 to refer to the information on association in the storage unit 304, and changes the driving force of the hydraulic motor for traveling 2M according to the count value (Step 3503).

Next, the controller 30 causes the count unit 302 to reset the count value (Step S504), and determines whether the engine 11 of the excavator 100 is stopped (Step S505).

At Step S505, if the engine 11 is not stopped, the controller 30 returns to Step S501. At Step S505, in the case where the engine is stopped, the controller 30 ends the process.

Here, with reference to FIG. 11B, the processing by the driving force change unit 303 at Step 3503 will be described in detail.

In the present embodiment, for example, assume that huntings are detected twice in one second that is the first predetermined period in which the controller 30 starts processing. In this case, the count value of the count unit 302 becomes "2". In the information on association illustrated in FIG. 11B, the value of the maximum displacement volume of the main pump 14 corresponding to the count value "2" is P1. Therefore, the driving force change unit 303 reduces the value of the maximum displacement volume of the main pump 14 down to P1, and resets the count value "2".

Assume that the controller 30 detects a hunting once in one second being the next predetermined period. In this case, the count value of the count unit 302 becomes "1". In the information on association illustrated in FIG. 11B, the value of the maximum displacement volume of the main pump 14 corresponding to the count value "1" is P2. Therefore, the driving force change unit 303 increases the value of the maximum displacement volume of the main pump 14 from the current value P1 to the value P2, and resets the count value "1". In this way, the driving force change unit 303 of the present embodiment counts the number of huntings that occur during each predetermined period, and causes the maximum displacement volume of the main pump 14 to be a value corresponding to the count value.

In other words, in the present embodiment, in a state where huntings continue, the count value increases, and the maximum displacement volume of the main pump 14 decreases. In other words, in the case where huntings continue, the driving force change unit 303 reduces the driving force of the hydraulic motor for traveling 2M. In addition, in the present embodiment, in a state in which huntings are settled, the count value decreases and the maximum displacement volume of the main pump 14 increases. In other words, in the case where a hunting does not occur in the amount of operation, the driving force of the hydraulic motor for traveling 2M returns to the original state.

In the present embodiment, in this way, the driving force of the hydraulic motor for traveling 2M is reduced more as the number of times of detected hunting increases; therefore, even in the case where an unintended operation is performed, a change in the load on the hydraulic motor for traveling 2M can be made smaller than a change in the amount of operation. In other words, the driving force change unit 303 can suppress a change in the pressure of the hydraulic oil discharged by the main pump 14 even in the case where an unintended operation is performed.

If the change of the load on the hydraulic motor for traveling 2M becomes smaller, the swing width during traveling (during traveling operations) also decreases, and hence, the driver can support his/her body, and the hunting in the amount of operation on the traveling operation device can be settled. In the present embodiment described above, although whether a hunting state occurs is determined based on the output waveform of the amount of operation, the present inventive concept is not necessarily limited as such. In particular, in the traveling operation, a composite operation with another hydraulic actuator is not executed, and a single operation of only the traveling operation is executed. Therefore, a change in the output of the amount of operation during traveling affects the detection value of the discharge pressure sensor 28 and the motor driving pressure.

In the present embodiment, whether a hunting state occurs may be determined, based on a detection value (output waveform) detected in the traveling drive system from the operation device 26 to the hydraulic motor for traveling 2M. For example, whether a hunting state occurs in the amount of operation may be determined, based on the detected value (output waveform) of the motor driving pressure. Further, whether a hunting state occurs in the amount of operation may be determined, based on the detection value (output waveform) of the discharge pressure sensor 28.

Figure 13A:
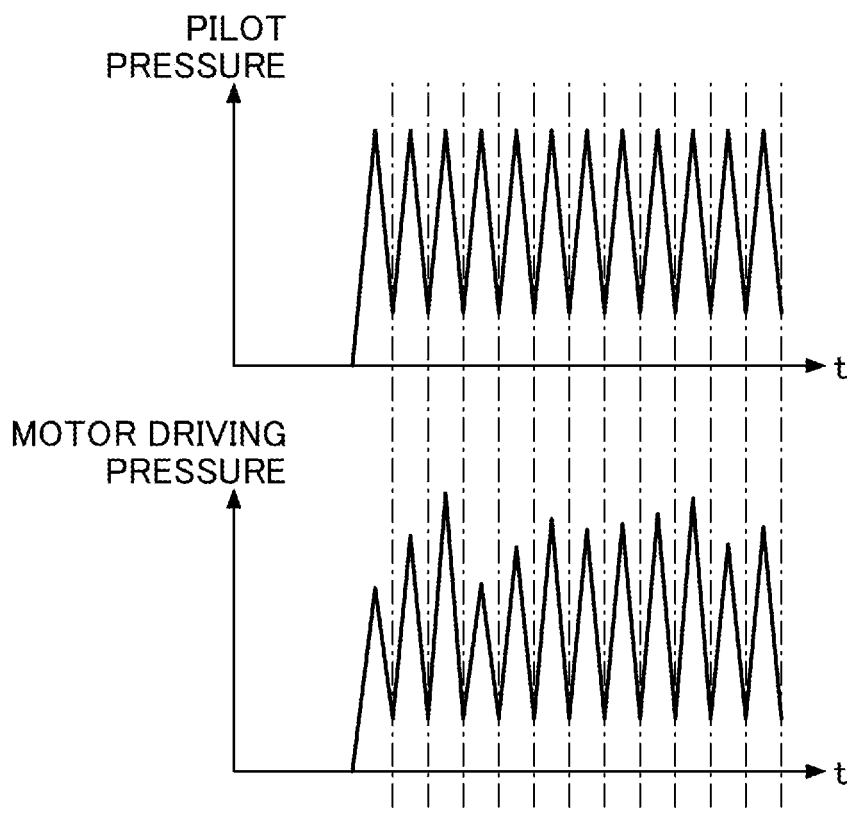
FIG. 13A is a diagram illustrating effects of the present embodiment.

In the following, with reference to FIGS. 13A and 13B, effects of the present embodiment will be described. FIG. 13A is a waveform diagram illustrating the pilot pressure and the driving pressure of the hydraulic motor for traveling 2M in the case where a hunting occurs in the excavator to which the present embodiment is not applied; and FIG. 13B is a waveform diagram illustrating the pilot pressure, the number of huntings, and the driving pressure of the hydraulic motor for traveling 2M in the case where huntings occur in the excavator 100 of the present embodiment.

Figure 13B:
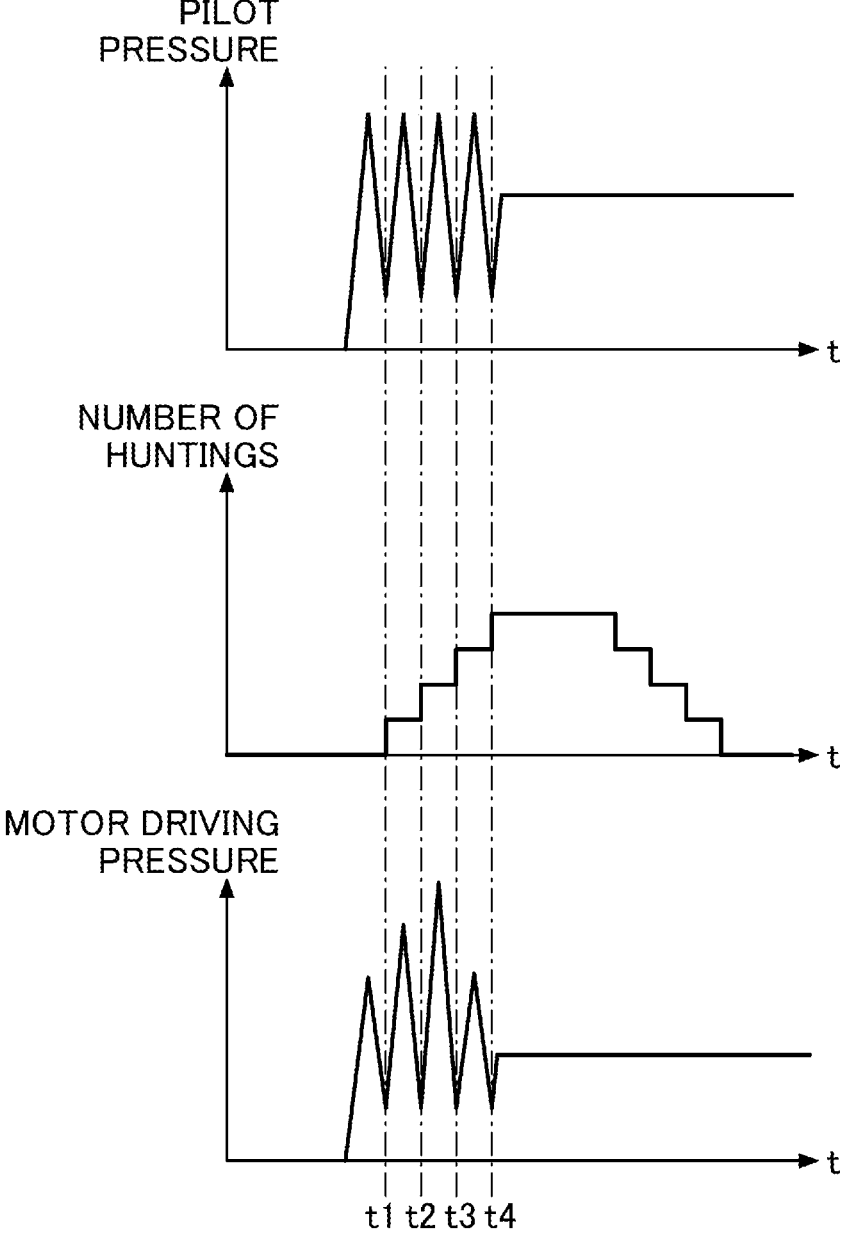
FIG. 13B is a diagram illustrating effects of the present embodiment.

In FIG. 13B, a hunting is detected once at the time t1; therefore, the driving force change unit 303 reduces the driving pressure of the hydraulic motor for traveling 2M by the amount corresponding to one hunting. However, in this state, the pilot pressure is changed periodically, and a hunting is detected once also at the time t2. Therefore, the driving force change unit 303 further reduces the driving pressure of the hydraulic motor for traveling 2M by the amount corresponding to one hunting.

Even in this state, as the pilot pressure is still changed periodically, a hunting is detected once even at the time t3. Therefore, the driving force change unit 303 further reduces the driving pressure of the hydraulic motor for traveling 2M by the amount corresponding to one hunting.

Also in this state, the pilot pressure is still changed periodically, and a hunting is detected once even at the time t4. Therefore, the driving force change unit 303 further reduces the driving pressure of the hydraulic motor for traveling 2M by the amount corresponding to one hunting.

The driving pressure of the hydraulic motor for traveling 2M is sufficiently reduced at the time t4; therefore, even in the case where the pilot pressure is changed by an unexpected operation by the driver, the change of the driving pressure of the hydraulic motor for traveling 2M is suppressed, and huntings in the amount of operation can be easily settled.

In contrast, in the example in FIG. 13A, it can be seen that once a hunting occurs, the vehicle is traveling in a state where huntings continue.

In this way, according to the present embodiment, even in the case where a hunting in the amount of operation occurs, huntings can be settled quickly, uncomfortable feeling during riding due to the swing of the machine body, the fatigue of the driver due to the body being swung, and the like can be reduced, and the load of the driver can be reduced.

Further, according to the present embodiment, huntings can be settled quickly; therefore, the excavator 100 can be caused to quickly return to a state of being capable of traveling stably, so as to be capable of traveling to the destination efficiently. In addition, according to the present embodiment, huntings can be settled quickly; therefore, damage that would occur in the machine body due to continuation of huntings can be reduced.

Note that in the present embodiment, although cases where the driver mainly operates the pedal have been described, the present inventive concept is not limited as such. In the present embodiment, the same applies to a hunting in the amount of operation occurring in the case where the driver operates a lever.

As above, preferred embodiments in the present disclosure have been described in detail. However, the present disclosure is not limited to the embodiments described above. Various modified examples, substitutions, and the like can be applied to the embodiments described above without departing from the scope of the present inventive concept. In addition, the separately described features can be combined unless a technical inconsistency is introduced.

For example, in the embodiments described above, a hydraulic operating system provided with a hydraulic pilot circuit is disclosed. For example, in the hydraulic pilot circuit related to the left traveling lever 26DL, the hydraulic oil supplied from the control pump 15 to the left traveling lever 26DL is supplied to the pilot port of the control valve 172L at a pressure corresponding to the opening degrees of the remote control valve moved by the tilting of the left traveling lever 26DL in the forward direction. Alternatively, in the hydraulic pilot circuit related to the right traveling lever 26DR, the hydraulic oil supplied from the control pump 15 to the right traveling lever 26DR is supplied to the pilot port of the control valve 172R at a pressure corresponding to the opening degrees of the remote control valve moved by the tilting of the right traveling lever 26DR in the forward direction.

However, an electrical operation system provided with an electrical pilot circuit may be adopted in place of the hydraulic operation system provided with a hydraulic pilot circuit. In this case, the amount of the lever operation of the electric operation lever in the electrical operation system is input into the controller 30, for example, as an electrical signal. In addition, a solenoid valve is arranged between the control pump 15 and the pilot port of each of the control valves. The solenoid valve is configured to operate in response to an electrical signal from the controller 30. With this configuration, once a manual operation is performed using the electric operation lever, by controlling the solenoid valve to increase or decrease the pilot pressure, the controller 30 can move each control valve by an electrical signal corresponding to the amount of the lever operation. Note that each control valve may be constituted with an electromagnetic spool valve. In this case, the electromagnetic spool valve operates electromagnetically in response to an electrical signal from the controller 30 corresponding to the amount of a lever operation on the electrical operation lever.

Figure 14:
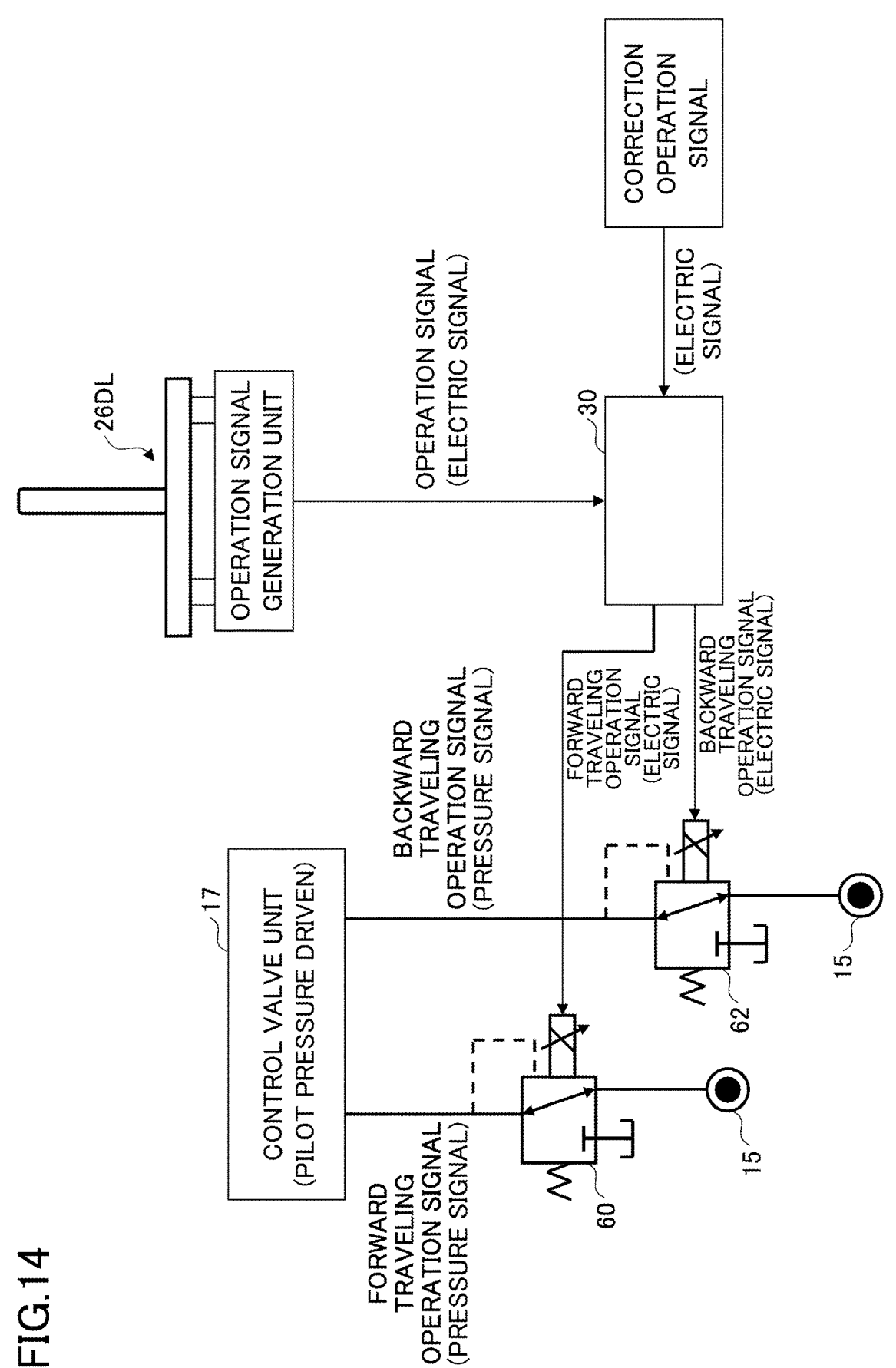
FIG. 14 is a diagram illustrating an example of a configuration of an electric operation system.

In the case where an electric operation system provided with an electric operation lever is adopted, the controller 30 can easily execute an autonomous control function compared to the case where the hydraulic operation system provided with the hydraulic operation lever is adopted. FIG. 14 illustrates an example of a configuration of an electric operation system. Specifically, the electric operation system illustrated in FIG. 14 is an example of a left traveling operation system for rotating the left hydraulic motor for traveling 2ML, and mainly configured with a pilot pressure-driven control valve unit 17, a left traveling lever 26DL as an electric operation lever, a controller 30, a solenoid valve 60 for a left forward operation, and a solenoid valve 62 for a left backward operation. The electric operation system in FIG. 14 may also be applied to a revolution operation system for causing the revolving upper body 3 to make a revolution; a boom operation system for causing the boom 4 to be elevated or lowered; an arm operation system for causing the arm 5 to open or close; a bucket operation system for causing the bucket 6 to open or close; and the like.

The pilot pressure-driven control valve unit 17 includes a control valve 171 as a straight travel valve (see FIG. 3), a control valve 172L for the left hydraulic motor for traveling 2ML (see FIG. 3), and a control valve 172R for the right hydraulic motor for traveling 2MR (see FIG. 3), a control valve 173 for the hydraulic motor for revolution 2A (see FIG. 3), a control valve 175 for the boom cylinder 7 (see FIG. 3), a control valve 176 for the arm cylinder 8 (see FIG. 3), and a control valve 174 for the bucket cylinder 9 (see FIG. 3), and the like. The solenoid valve 60 is configured to be capable to adjusting the pressure of the hydraulic oil in the pipeline connecting the control pump 15 and the forward pilot port of the control valve 172L. The solenoid valve 62 is configured to be capable to adjusting the pressure of the hydraulic oil in the pipeline connecting the control pump 15 and the backward pilot port of the control valve 172L.

In the case where a manual operation is performed, the controller 30 generates a forward operation signal (electric signal) or a backward operation signal (electric signal), in response to an operation signal (electric signal) output by an operation signal generation unit of the left traveling lever 26DL. The operation signal output by the operation signal generation unit of the left traveling lever 26DL is an electrical signal that changes according to the amount of operation and the operation direction of the left traveling lever 26DL.

Specifically, in the case where the left traveling lever 26DL is operated in the forward direction, the controller 30 outputs a forward operation signal (electric signal) corresponding to the amount of lever operation to the solenoid valve 60. The solenoid valve 60 operates in response to the forward operation signal (electric signal) to control the pilot pressure as a forward operation signal (pressure signal) acting on the forward pilot port of the control valve 172L. Similarly, in the case where the left traveling lever 26DL is operated in the backward direction, the controller 30 outputs a backward operation signal (electric signal) corresponding to the amount of lever operation to the solenoid valve 62. The solenoid valve 62 operates in response to the backward operation signal (electric signal) to control a pilot pressure as a backward operation signal (pressure signal) acting on a backward pilot port of the control valve 172L.

In the case where autonomous control is executed, the controller 30 generates a forward operation signal (electric signal) or a backward operation signal (electric signal), for example, in response to a correction operation signal (electric signal), instead of in response to an operation signal (electric signal) output by the operation signal generation unit of the left traveling lever 26DL. The correction operation signal may be an electric signal generated by the controller 30, or may be an electric signal generated by a control device or the like other than the controller 30.

In addition, in the embodiment described above, although the excavator 100 is configured such that an operator can ride in the cabin 10, the excavator 100 may be a remote-controlled excavator. In this case, the operator can remotely operate the excavator 100, by using, for example, an operation device and a communication device installed in a remote control room outside the work site. In this case, the controller 30 may be installed in the remote control room. In other words, the controller 30 installed in the remote control room and the excavator 100 may constitute a system for an excavator.

The invention claimed is:

1. An excavator comprising:
   a traveling lower body including a crawler, the crawler including a left crawler and a right crawler;
   a revolving upper body installed on the traveling lower body, and configured to be capable of revolving;
   a traveling hydraulic motor configured to drive the crawler;
   a traveling operation device configured to operate the traveling hydraulic motor, the traveling operation device including a left traveling operation device corresponding to the left crawler and a right traveling operation device corresponding to the right crawler;
   a hydraulic pump configured to supply hydraulic oil to the traveling hydraulic motor;
   a detector configured to detect an operation state of the traveling operation device; and
   a hardware processor configured to
      determine whether there is a predetermined difference between an amount of operation of the left traveling operation device and an amount of operation of the right traveling operation device based on an output of the detector, and
      upon determining that there is the predetermined difference between the amount of operation of the left traveling operation device and the amount of operation of the right traveling operation device, suppress an amount of change in a command value related to a flow rate of the hydraulic oil discharged by the hydraulic pump so that the flow rate of the hydraulic oil discharged by the hydraulic pump changes within a predetermined range defined by an upper limit and a lower limit.

2. The excavator as claimed in claim 1, wherein the hardware processor is configured to determine that the traveling lower body is turning and suppress the change in the flow rate of the hydraulic oil discharged by the hydraulic pump, upon determining that there is the predetermined difference between the amount of operation of the left traveling operation device and the amount of operation of the right traveling operation device.

3. The excavator as claimed in claim 2, wherein the predetermined difference occurs in a case where, with respect to operation amounts of the left traveling operation device and the right traveling operation device, one of the operation amounts is increased; one of the operation amounts is decreased; both of the operation amounts are increased; or both of the operation amounts are decreased.

4. The excavator as claimed in claim 1, wherein the hardware processor is configured to suppress the amount of change in the command value related to the flow rate of the hydraulic oil discharged by the hydraulic pump, based on a pressure of the hydraulic oil flowing through a hydraulic circuit or an amount of operation of the traveling operation device.

5. The excavator as claimed in claim 1, wherein a value corresponding to the upper limit and a value corresponding to the lower limit are set for the amount of change in the command value.

6. The excavator as claimed in claim 5, wherein the hardware processor is configured to suppress the amount of change in the command value within a range between the value corresponding to the upper limit and the value corresponding to the lower limit.

7. The excavator as claimed in claim 6, wherein the range of the command value is set so that a difference between the command value used in a previous control period and the command value used in a current control period is less than or equal to a predetermined value.

8. The excavator as claimed in claim 1, wherein the hydraulic pump is an electronically-controlled variable-capacity hydraulic pump.

9. The excavator as claimed in claim 1, further comprising:
   a pump regulator configured to control a discharge amount of the hydraulic pump,
   wherein the hardware processor is further configured to suppress the amount of change in the command value transmitted from the hardware processor to the pump regulator.

10. The excavator as claimed in claim 1, further comprising:
   an attachment attached to the revolving upper body;
   an attachment actuator configured to drive the attachment; and
   an attachment operation device configured to operate the attachment actuator,
   wherein the detector is further configured to detect an operation state of the attachment operation device, and
   the hardware processor is further configured to
      determine whether the traveling operation device alone is operated without the attachment operation device being operated, based on the output of the detector, and
      detect the amount of operation of the left traveling operation device and the amount of operation of the right traveling operation device based on the output of the detector and determine whether there is the predetermined difference between the detected amount of operation of the left traveling operation device and the detected amount of operation of the right traveling operation device, in response to determining that the traveling operation device alone is operated without the attachment operation device being operated.

* * * * *